(12) United States Patent
Suzuki et al.

(10) Patent No.: US 11,867,624 B2
(45) Date of Patent: Jan. 9, 2024

(54) SYSTEM FOR RECONSTRUCTING AND OUTPUTTING A STRUCTURE OF AN ESTIMATION SAMPLE USING REFRACTIVE INDEX DISTRIBUTION OF UPDATED ESTIMATION SAMPLE

(71) Applicant: Evident Corporation, Nagano (JP)

(72) Inventors: Yoshimasa Suzuki, Kawasaki (JP); Toshiro Okamura, Hino (JP)

(73) Assignee: Evident Corporation, Nagano (JP)

( * ) Notice: Subject to any disclaimer, the term of this patent is extended or adjusted under 35 U.S.C. 154(b) by 69 days.

(21) Appl. No.: 17/528,404

(22) Filed: Nov. 17, 2021

(65) Prior Publication Data

US 2022/0074854 A1 Mar. 10, 2022

Related U.S. Application Data

(63) Continuation of application No. PCT/JP2019/031140, filed on Aug. 7, 2019.

(51) Int. Cl.
*G01N 21/41* (2006.01)
*G02B 21/08* (2006.01)

(52) U.S. Cl.
CPC ....... *G01N 21/4133* (2013.01); *G02B 21/086* (2013.01); *G01N 2021/4153* (2013.01); *G01N 2201/12* (2013.01)

(58) Field of Classification Search
CPC ....... G01N 21/4133; G01N 2021/4153; G01N 2201/12; G01N 21/41; G02B 21/086
See application file for complete search history.

(56) References Cited

U.S. PATENT DOCUMENTS

2015/0100278 A1* 4/2015 Gaylord ............... G02B 21/367
702/189
2016/0139388 A1 5/2016 Asundi et al.

OTHER PUBLICATIONS

International Search Report and Written Opinion of the International Searching Authority dated Nov. 5, 2019, Issued in International Application No. PCT/JP2019/031140.
(Continued)

*Primary Examiner* — Hwa Andrew Lee
(74) *Attorney, Agent, or Firm* — Scully, Scott, Murphy & Presser, P.C.

(57) ABSTRACT

A refractive index distribution estimating system includes an illumination optical system configured to illuminate a sample, an imaging optical system configured to form an optical sample image, an image sensor configured to capture optical images of the sample, and a processor configured to reconstruct a refractive index distribution of the sample from images. The processor performs processing including the steps of: estimating the sample; calculating the estimated sample image from a plurality of first wavefronts emanating from a plurality of modeled light sources; optimizing a refractive index distribution of the estimated sample from a plurality of second wavefronts after the first wavefronts pass through the estimated sample, the captured image, and the image of the estimated sample; updating the estimation sample by repeating calculation of the estimated sample image and optimization of the refractive index distribution of the estimated sample; and reconstructing and outputting a structure of the estimated sample.

11 Claims, 34 Drawing Sheets

(56) References Cited

OTHER PUBLICATIONS

Soto J M, et al., Label-free quantitative 3D tomographic imaging for partially coherent light microscopy, Optics Express, Jun. 26, 2017, vol. 25, No. 14, p. 15699-15712.
Rodrigo J A, et al., Rapid quantitative phase imaging for partially coherent light microscopy, Optics Express, May 27, 2014, vol. 22, No. 11, p. 13472-13483.
Rodrigo J A, et al., Fast label-free optical diffraction tomography compatible with conventional wide-field microscopes, Proc. of SPIE, Jun. 21, 2019, vol. 11060, p. 1106016-1-1106016-10.
Bao Y, et al., Iterative optimization in tomographic deconvolution phase microscopy, Journal of the Optical Society of America A, Mar. 26, 2018, vol. 35, No. 4, p. 652-660.
Tian L, et al., 3D intensity and phase imaging from light field measurements in an LED array microscope, Optica, Jan. 28, 2015, vol. 2, No. 2, p. 104-111.
Jenkins M H, et al., Three-dimentional quantitative phase imaging via tomographic deconvolution phase microscopy, Applied Optics, Oct. 27, 2015, vol. 54, No. 31, p. 9213-9227.
International Preliminary Report on Patentability dated Feb. 17, 2022 and Written Opinion dated Nov. 5, 2019 received in PCT/JP2019/031140.

\* cited by examiner

FIG. 9

LIGHT SOURCE 1   $\Delta T_s^1(r)$ $\vdots$

LIGHT SOURCE m-1   $\Delta T_s^{m+1}(r)$

LIGHT SOURCE m   $\Delta T_s^1(r)$

LIGHT SOURCE m+1   $\Delta T_s^{m+1}(r)$ $\vdots$

LIGHT SOURCE $N_{LS}$   $\Delta T_s^{N_{LS}}(r)$ $\Rightarrow T_s(r) = T_s(r) + \alpha \sum_m T_s^m(r)$

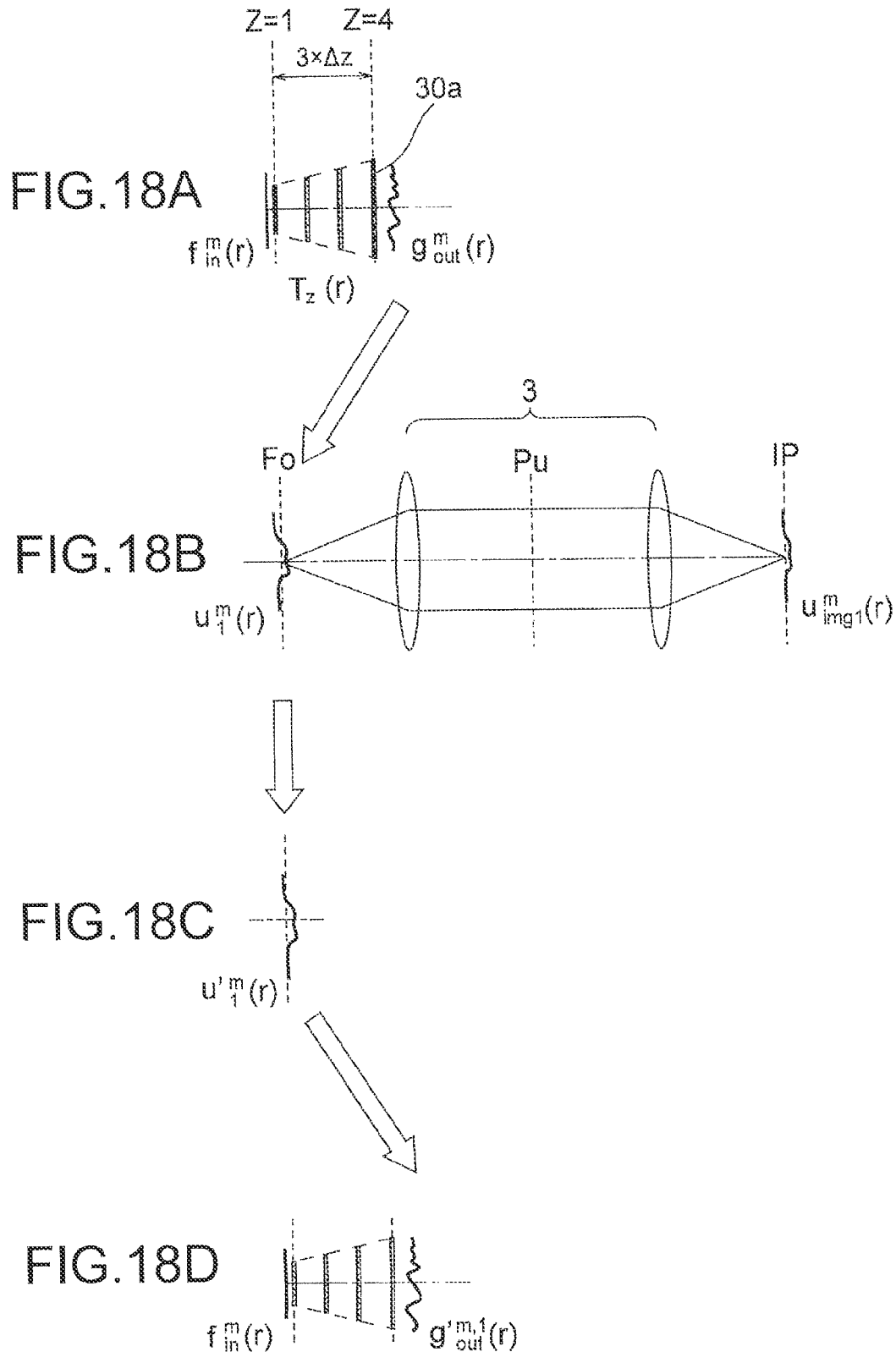

FIG.22

|  | Z=1 | Z=2 | Z=3 | Z=4 |
|---|---|---|---|---|
| LIGHT SOURCE 1 | $\Delta T_1^{1,1}(r)$ | $\Delta T_2^{1,1}(r)$ | $\Delta T_3^{1,1}(r)$ | $\Delta T_4^{1,1}(r)$ |
| ⋮ | ⋮ | ⋮ | ⋮ | ⋮ |
| LIGHT SOURCE m-1 | $\Delta T_1^{m-1,1}(r)$ | $\Delta T_2^{m-1,1}(r)$ | $\Delta T_3^{m-1,1}(r)$ | $\Delta T_4^{m-1,1}(r)$ |
| LIGHT SOURCE m | $\Delta T_1^{m,1}(r)$ | $\Delta T_2^{m,1}(r)$ | $\Delta T_3^{m,1}(r)$ | $\Delta T_4^{m,1}(r)$ |
| LIGHT SOURCE m+1 | $\Delta T_1^{m+1,1}(r)$ | $\Delta T_2^{m+1,1}(r)$ | $\Delta T_3^{m+1,1}(r)$ | $\Delta T_4^{m+1,1}(r)$ |
| ⋮ | ⋮ | ⋮ | ⋮ | ⋮ |
| LIGHT SOURCE $N_{LS}$ | $\Delta T_1^{N_{LS},1}(r)$ | $\Delta T_2^{N_{LS},1}(r)$ | $\Delta T_3^{N_{LS},1}(r)$ | $\Delta T_4^{N_{LS},1}(r)$ |

FIG.27A 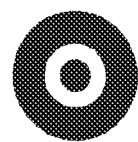 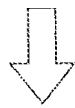 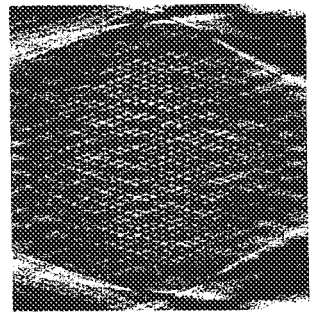
FIG.27B 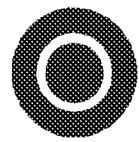 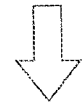 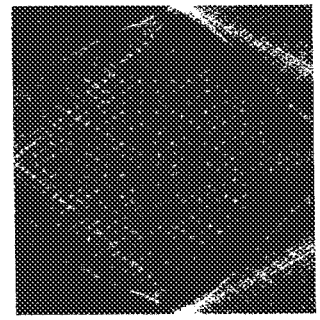
FIG.27C 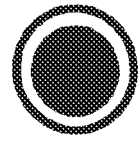 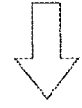 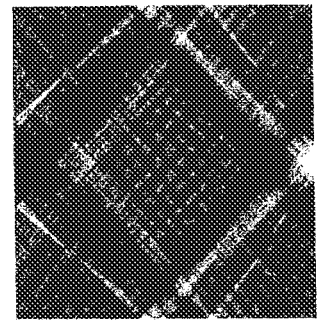

SYSTEM FOR RECONSTRUCTING AND OUTPUTTING A STRUCTURE OF AN ESTIMATION SAMPLE USING REFRACTIVE INDEX DISTRIBUTION OF UPDATED ESTIMATION SAMPLE

CROSS-REFERENCE TO RELATED APPLICATION

The present application is a continuation application of International Application No. PCT/JP2019/031140 filed on Aug. 7, 2019, the entire contents of which are incorporated herein by reference.

BACKGROUND

Technical Field

The present disclosure relates to a refractive index distribution estimating system.

Description of the Related Art

Reconstruction technology which reproduces an actual object by an object model on a computer is known. In this reconstruction technology, the object model on the computer is changed by optimization technique such that an image of a measured object and an image of a calculated object model are matched. Finally, when the image of the measured object and the image of the calculated object model are matched, the object model on the computer reproduces the actual object.

The image of the object is acquired by a measurement optical system. What the image of the object model will be like is calculated by image computation technique. In this reconstruction technology, therefore, two things are important: the measurement optical system and the image computation technique.

For example, it is possible to use a microscope optical system as the measurement optical system. In the microscope optical system, an image of a sample is acquired using a halogen lamp or an LED. The halogen lamp and the LED are incoherent light sources.

Illumination using an incoherent light source is classified into incoherent illumination, coherent illumination, and partial coherent illumination, depending on illumination conditions. These types of illumination will be explained.

Koehler illumination is used in a microscope. In Koehler illumination, a light source is disposed on a focal plane of a condenser lens, or an image of the light source is formed on the focal plane of the condenser lens. Light from each point of the light source is converted by the condenser lens into a parallel light ray. Thus, the sample is illuminated with a parallel light flux.

When the size of the light source is changed, spatial coherence of illumination light on a sample surface changes. When the spatial coherence of illumination light changes, the imaging characteristics change.

Even when the light source is an incoherent light source, the light source can be considered as a point light source by making the size of the light source extremely small. Illumination that irradiates a sample with light from a point light source is called coherent illumination.

The light source can be considered as a surface light source by making the size of the light source extremely large. In particular, by making the size of the light source large so as to be able to illuminate the entire region of the pupil of an objective lens, it is possible to illuminate the sample with light from the light source from various directions. Such illumination is called incoherent illumination.

In the surface light source, the size of the light source is set such that a part of the pupil of the objective lens can be illuminated. Such illumination is called partial coherent illumination. Partial coherent illumination is intermediate illumination between coherent illumination and incoherent illumination.

The image computation technique can be classified into linear computation and nonlinear computation. In the linear computation, single scattering in a sample alone is taken into consideration. In the nonlinear computation, not only single scattering but also multiple scattering is taken into consideration.

In the linear computation, first-order Born approximation is used. In Born approximation, even when scattering occurs two or more times in a sample, the scattering two or more times is ignored. In the linear computation, sample information and output information are defined by one-to-one correspondence. It is therefore possible to calculate the output information analytically. The output information is, for example, an image of the sample.

For the linear computation, imaging in a microscope will be described as an example. When sample information (a transmittance distribution of a sample) O and output information (an image intensity distribution) I are considered as a linear system of convolution of the point spread function PSF of an optical system, the output information I is expressed by the following expression.

$$I = PSF * O$$

Here, * denotes convolution.

In the linear computation, the calculation time is short but the calculation accuracy is low because the scattering two or more times is ignored. An image of an object model reconstructed using linear computation is obtained by deconvolving the image of the measured sample by the point spread function.

The nonlinear computation is a computation technique that considers occurrence of scattering multiple times in a sample. The beam propagation method is one of the nonlinear computation. In the beam propagation method, an object model is replaced by a plurality of thin layers. Then, an image of the object model is calculated by successively calculating wavefront change when light passes through the layers.

The beam propagation method can calculate an image of an object model more accurately than the linear computation does.

"3D intensity and phase imaging from light field measurements in an LED array microscope", L. Tian and L. Waller, Optica 2, 104-111 (2015) proposes a method of reconstructing an object using coherent illumination for a microscope as illumination of the measurement optical system and using the beam propagation method as image computation technique.

In this method, a microscope having an LED array is used. The LED array is disposed at the pupil position of an illumination optical system. A sample is irradiated with illumination at various angles by changing the turning-on position of LEDs. Since an image of the sample is acquired at each irradiation angle, a plurality of images of the sample are acquired.

An initial value of a refractive index distribution of the sample is found from the acquired images of the sample using the light field technology. The light field technology is one of the reconstruction technology. In oblique illumination, the image of the sample is displaced in proportion to the distance from the focus position. The light field technology reconstructs the sample using this displacement of the image of the sample.

Once the initial value is found, the refractive index distribution of the sample is brought closer to a correct value using the gradient descent method. The gradient descent method is a process of updating parameters of a sample such that the difference is reduced between a wavefront propagating through the sample in the forward direction from the light source side and a wavefront being corrected by image information and propagating in the inverse direction from the image side. The beam propagation method is used for calculation of propagation of wavefronts.

SUMMARY

A refractive index distribution estimating system according at least some embodiments of the present disclosure includes:
an illumination optical system configured to illuminate a sample with partial coherent illumination;
an imaging optical system configured to form an optical image of the sample;
an image sensor configured to acquire a captured image from the optical image of the sample formed by the imaging optical system; and
a processor configured to reconstruct a refractive index distribution of the sample from the captured image, wherein
the processor performs processing including the steps of:
estimating an estimation sample including a refractive index distribution of the sample;
calculating an image of the estimation sample by calculating a plurality of first intensity distributions at an imaging position of the imaging optical system, using a plurality of first wavefronts emanating from a plurality of light sources that model an intensity distribution of a pupil of the illumination optical system, and summing the first intensity distributions;
optimizing a refractive index distribution of the estimation sample using a plurality of second wavefronts after the first wavefronts pass through the estimation sample, the captured image, and the image of the estimation sample;
updating the estimation sample by repeating calculation of the image of the estimation sample and optimization of the refractive index distribution of the estimation sample; and
reconstructing and outputting a structure of the estimation sample using a refractive index distribution of an updated estimation sample.

A refractive index distribution estimating system according to at least some embodiments of the present disclosure includes:
an illumination optical system configured to illuminate a sample with light rays incident simultaneously from a plurality of directions;
an imaging optical system configured to form an optical image of the sample;
an image sensor configured to acquire a captured image from the optical image of the sample formed by the imaging optical system; and
a processor configured to reconstruct a refractive index distribution of the sample from the captured image, wherein
the processor performs processing including the steps of:
estimating an estimation sample including a refractive index distribution of the sample;
calculating an image of the estimation sample by calculating a plurality of first intensity distributions at an imaging position of the imaging optical system, using a plurality of first wavefronts emanating from a plurality of light sources that model an intensity distribution of a pupil of the illumination optical system, and summing the first intensity distributions;
optimizing a refractive index distribution of the estimation sample using a plurality of second wavefronts after the first wavefronts pass through the estimation sample, the captured image, and the image of the estimation sample;
updating the estimation sample by repeating calculation of the image of the estimation sample and optimization of the refractive index distribution of the estimation sample; and
reconstructing and outputting a structure of the estimation sample using a refractive index distribution of the updated estimation sample.

BRIEF DESCRIPTION OF THE DRAWINGS

FIG. 9 is a diagram illustrating a gradient of a sample;

FIG. 18A, FIG. 18B, FIG. 18C, and FIG. 18D are diagrams illustrating correction of wavefronts;

FIG. 22 is a diagram illustrating a gradient of a sample;

FIG. 27A, FIG. 27B, and FIG. 27C are diagrams illustrating an aperture member and a captured image;

DETAILED DESCRIPTION

Figure 1A:
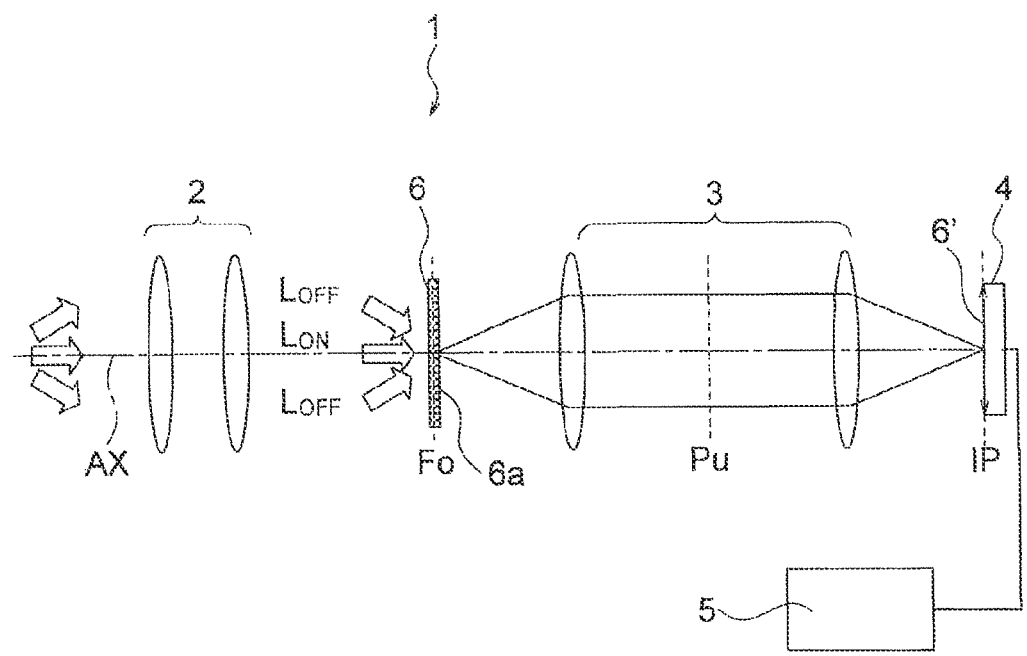
FIG. 1A and FIG. 1B are diagrams illustrating a refractive index distribution estimating system of the present embodiment and a captured image.

Prior to the explanation of examples, action and effect of embodiments according to certain aspects of the present disclosure will be described below. In the explanation of the action and effect of the embodiments concretely, the explanation will be made by citing concrete examples. However, similar to a case of the examples to be described later, aspects exemplified thereof are only some of the aspects included in the present disclosure, and there exists a large number of variations in these aspects. Consequently, the present disclosure is not restricted to the aspects that will be exemplified.

In a refractive index distribution estimating system of the present embodiment, a captured image and an image of an estimation sample are used. The captured image is an image of a sample acquired by an optical device. The image of the estimation sample is an image of an estimation sample obtained by simulation.

In simulation, the estimation sample is updated such that a residual is equal to or smaller than a threshold value. The residual is the difference between the image of the estimation sample and the captured image. When the residual is equal to or smaller than the threshold value, the image of the estimation sample identical with the captured image is obtained, or the image of the estimation sample substantially identical with the captured image is obtained.

In acquisition of the captured image, partial coherent illumination is used. Thus, the simulation is also premised on partial coherent illumination.

In a first simulation, the sample is a sample having a small thickness (hereinafter referred to as "thin sample"). In a second simulation and a third simulation, the sample is a sample having a large thickness (hereinafter referred to as "thick sample").

A refractive index distribution estimating system of the present embodiment includes an illumination optical system configured to illuminate a sample with partial coherent illumination, an imaging optical system configured to form an optical image of the sample, an image pickup element configured to acquire a captured image from the optical image of the sample formed by the imaging optical system, and a processor configured to reconstruct a refractive index distribution of the sample from the captured image. The processor performs processing including the steps of: estimating an estimation sample including a refractive index distribution of the sample; calculating an image of the estimation sample by calculating a plurality of first intensity distributions at an imaging position of the imaging optical system, using a plurality of first wavefronts emanating from a plurality of light sources that model an intensity distribution of a pupil of the illumination optical system, and summing the first intensity distributions; optimizing a refractive index distribution of the estimation sample using a plurality of second wavefronts after the first wavefronts pass through the estimation sample, the captured image, and the image of the estimation sample; updating the estimation sample by repeating calculation of the image of the estimation sample and optimization of the refractive index distribution of the estimation sample; and reconstructing and outputting a structure of the estimation sample using a refractive index distribution of an updated estimation sample.

Figure 1B:
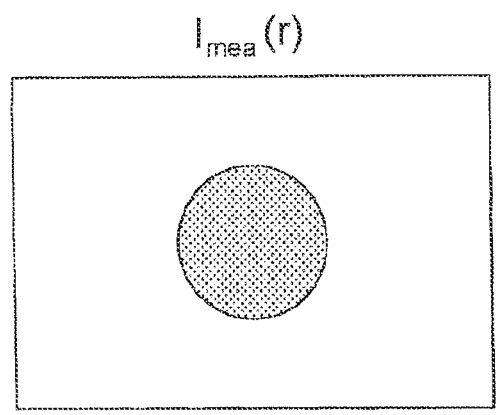

FIG. 1A and FIG. 1B are diagrams illustrating a refractive index distribution estimating system of the present embodiment and a captured image. FIG. 1A is a diagram illustrating a refractive index distribution estimating system. FIG. 1B is a diagram illustrating a captured image.

As illustrated in FIG. 1A, a refractive index distribution estimating system 1 includes an illumination optical system 2, an imaging optical system 3, an image pickup element 4, and a processor 5. The illumination optical system 2 and the imaging optical system 3 form a measurement optical system.

A sample 6 is positioned between the illumination optical system 2 and the imaging optical system 3. The sample 6 is a thin sample. A focus position Fo of the imaging optical system 3 is positioned inside the sample 6. For example, the distance between the focus position Fo and a surface 6a of the sample 6 is $\Delta z1$.

Light rays are simultaneously incident on the sample 6 from a plurality of directions. In FIG. 1A, a light ray $L_{ON}$ and a light ray $L_{OFF}$ are illustrated. The light ray $L_{ON}$ is a light ray parallel to an optical axis AX. The light ray $L_{OFF}$ is a light ray intersecting the optical axis AX.

In this way, the sample 6 is illuminated with light rays simultaneously incident from a plurality of directions. Such illumination includes incoherent illumination and partial coherent illumination. In the refractive index distribution estimating system 1, the partial coherent illumination is used.

Coherence of light includes temporal coherence and spatial coherence. As used herein the coherence refers to spatial coherence.

Figure 2A:
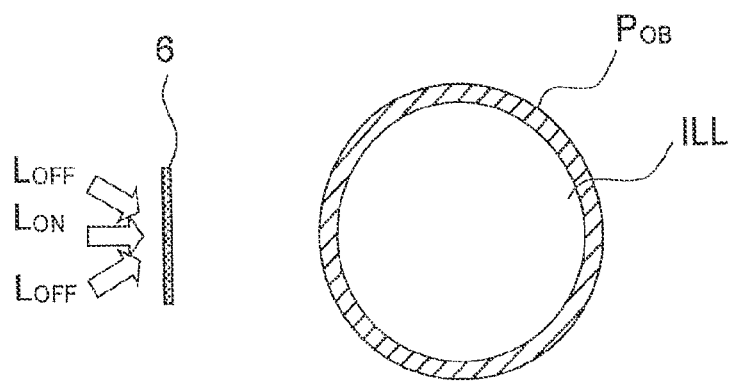
FIG. 2A and FIG. 2B are diagrams illustrating illumination light and an illumination region.
Figure 2B:
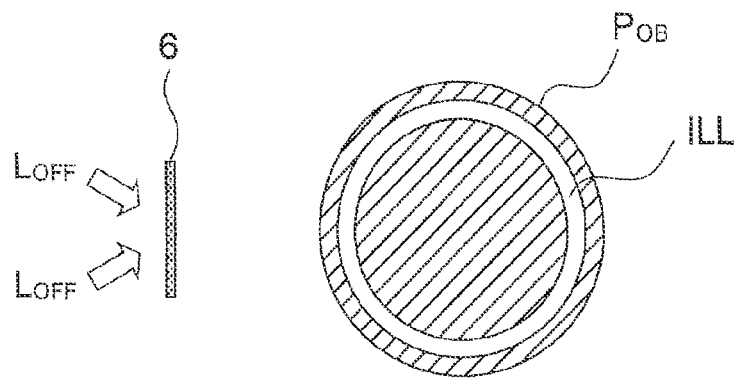

FIG. 2A and FIG. 2B are diagrams illustrating illumination light and an illumination region. FIG. 2A is a diagram illustrating a first example of illumination light and an illumination region. FIG. 2B is a diagram illustrating a second example of illumination light and an illumination region. Each diagram illustrates illumination light incident on the sample and an illumination region at a pupil position of the imaging optical system.

In the first example, the light ray $L_{ON}$ and the light ray $L_{OFF}$ are used for illumination. At a pupil position Pu of the imaging optical system 3, the shape of an illumination region ILL is circular. The illumination region ILL is narrower than a pupil $P_{OB}$ of the imaging optical system 3. Thus, illumination in the first example is partial coherent illumination.

In the second example, the light ray $L_{OFF}$ is used alone for illumination. At the pupil position Pu, the shape of the illumination region ILL is annular. The illumination region ILL is narrower than the pupil $P_{OB}$. Thus, illumination in the second example is partial coherent illumination.

Returning to FIG. 1A, the description continues. Light emanating from the sample 6 is collected on an imaging plane IP by the imaging optical system 3. An optical image 6' is formed on the imaging plane IP. The optical image 6' is an optical image of the sample 6.

An image pickup surface of the image pickup element 4 is positioned at the imaging plane IP. An image of the optical image 6' is captured by the image pickup element 4. As a result, a captured image $I_{mea}(r)$ illustrated in FIG. 1B is obtained, where r represents two-dimensional coordinates (x,y).

Since the sample 6 is a thin sample, one captured image is acquired. Thus, the imaging optical system 3 and the image pickup element 4 do not move in the optical axis direction. The sample 6 also does not move in the optical axis direction.

The captured image $I_{mea}(r)$ is input to the processor 5. In the processor 5, simulation of an image of an estimation sample is performed using the captured image $I_{mea}(r)$.

Figure 3:
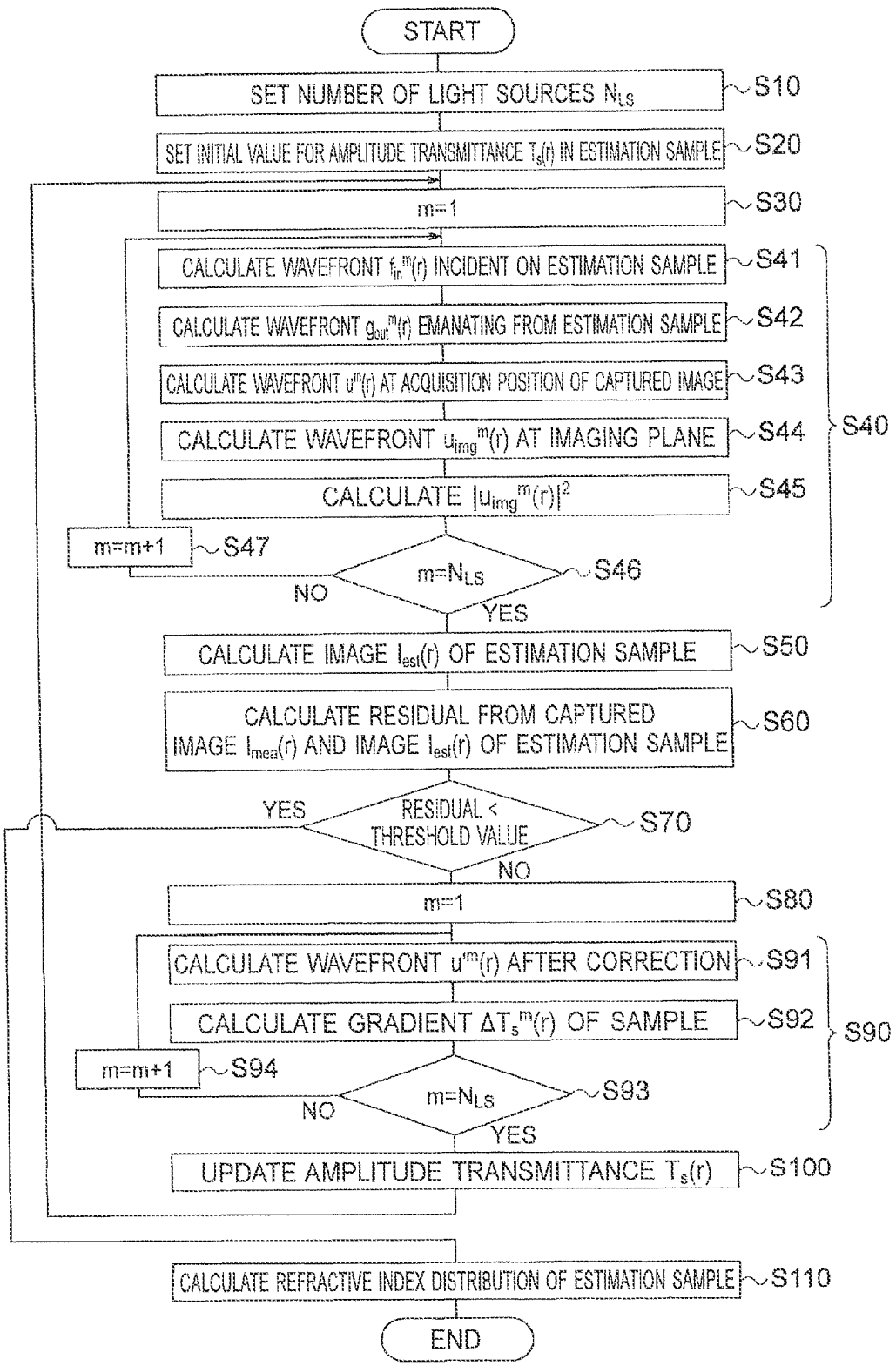
FIG. 3 is a flowchart of a first simulation.

FIG. 3 is a flowchart of the first simulation. In the measurement optical system illustrated in FIG. 1A, the illumination region is formed of an infinite number of point light sources. In simulation, it is not possible to handle an infinite number of point light sources. Then, the illumination region is divided into a plurality of minute regions.

It is possible to consider each of the minute regions as a point light source. By dividing the illumination region into a plurality of minute regions, it is possible to reduce the number of point light sources.

Figure 4A:
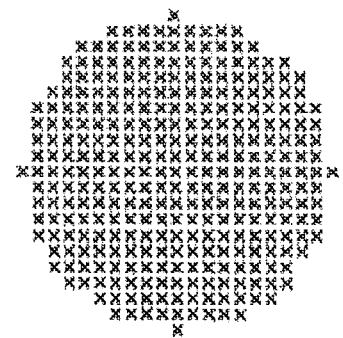
FIG. 4A and FIG. 4B are diagrams illustrating divided illumination regions.
Figure 4B:
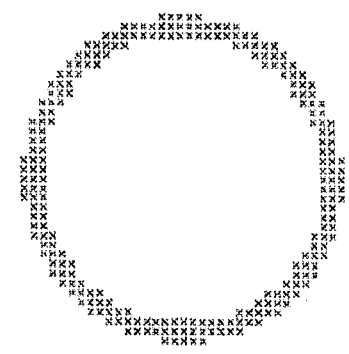

FIG. 4A and FIG. 4B are diagrams illustrating the divided illumination regions. FIG. 4A is a diagram illustrating a first example of the divided illumination regions. FIG. 4B is a diagram illustrating a second example of the divided illumination regions.

In the first example, a circular illumination region is divided into a plurality of minute regions. In the second example, an annular illumination region is divided into a plurality of minute regions.

As described above, it is possible to consider each of the minute regions as a point light source. Thus, in the first example, the circular illumination region is formed with a plurality of point light sources. In the second example, the annular illumination region is formed with a plurality of point light sources.

Figure 5:
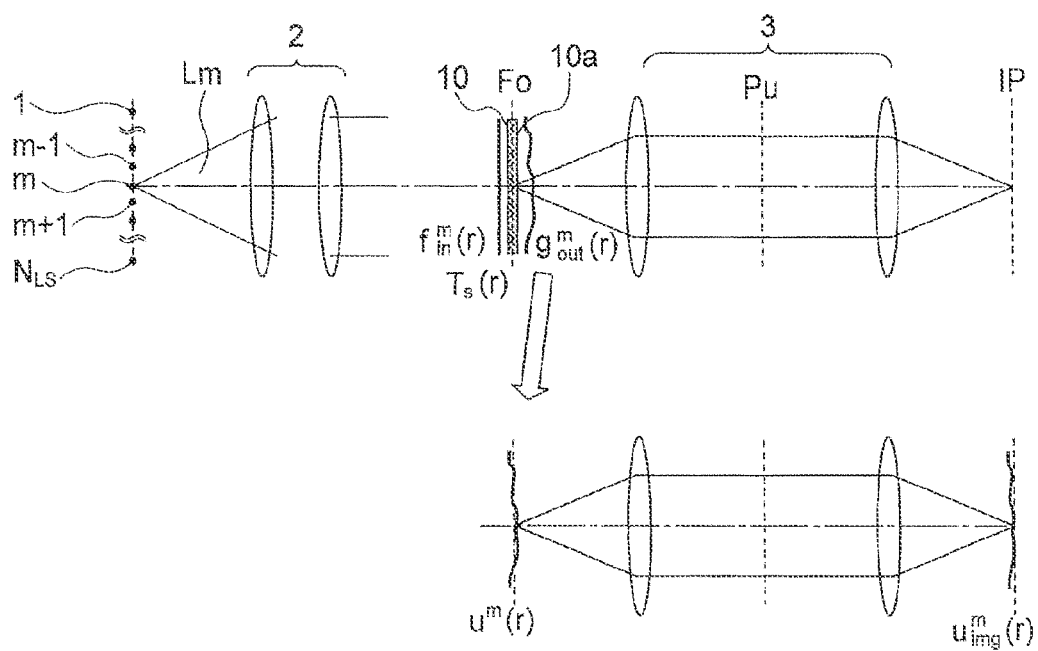
FIG. 5 is a diagram illustrating an optical system for use in simulation.

FIG. 5 is a diagram illustrating an optical system for use in simulation. The optical system for use in simulation is the same as the measurement optical system that acquires the captured image $I_{mea}(r)$. In simulation, an estimation sample 10 is used instead of the sample 6.

FIG. 5 illustrates the estimation sample 10, a wavefront $f_{in}^{m}(r)$, an amplitude transmittance $T_s(r)$, a wavefront $g_{out}^{m}(r)$, a wavefront $u^m(r)$ at the acquisition position of a captured image, and a wavefront $u_{img}^{m}(r)$ at the imaging plane.

In FIG. 5, a first light source to an $N_{LS}$-th light source are illustrated. It is possible to dispose the light sources at the pupil position of the illumination optical system 2. By doing so, it is possible to model an intensity distribution of the pupil of the illumination optical system 2 with a plurality of light sources.

Returning to FIG. 3, the simulation will be described. The simulation includes a step of estimating an estimation sample; a step of calculating an image of the estimation sample; a step of optimizing a refractive index distribution of the estimation sample; a step of updating the estimation sample; and a step of reconstructing and outputting a structure of the estimation sample.

At step S10, the number of light sources $N_{LS}$ is set. The number of light sources $N_{LS}$ is the number of divisions when the illumination region is divided into minute regions. In simulation, the circular illumination region illustrated in FIG. 4A is used.

Step S20 is the step of estimating an estimation sample. For the sample 6, one captured image has been acquired. The estimation sample 10 is a thin sample and thus can be considered as one thin layer. Therefore, the setting of an initial value of an amplitude transmittance is performed once.

At step S20, an initial value is set for the amplitude transmittance $T_s(r)$ in the estimation sample 10.

In order to calculate an image of the estimation sample 10, information on the estimation sample 10, for example, a refractive index distribution is required. The estimation sample 10 is a sample that models the sample 6. Thus, it is desirable to use the refractive index distribution of the sample 6 for the refractive index distribution of the estimation sample 10.

However, the refractive index distribution of the sample 6 is unable to be obtained accurately from the captured image $I_{mea}(r)$. Thus, the refractive index distribution of the estimation sample 10 has to be estimated.

As indicated by Expression (1), it is possible to convert a refractive index distribution $n_s(r)$ at the imaging plane into the amplitude transmittance $T_s(r)$. Thus, at step S20, an initial value of the amplitude transmittance $T_s(r)$ in the estimation sample 10 is set.

$$T_s(r)=\exp(i2\pi n_s(r)dz/\lambda) \qquad (1)$$

where, $\lambda$ is a wavelength of illumination light, and dz is a thickness of the sample.

When the value of the amplitude transmittance $T_s(r)$ can be estimated from a captured image $I_{mea1}(r)$, the estimated value may be used as the initial value. Furthermore, when the value of the amplitude transmittance $T_s(r)$ can be estimated by other methods, it is possible to set the estimated value as the initial value. When it is not possible to estimate the initial value, for example, $T_s(r)=1$ is set.

At step S30, the value of a variable m is initialized. Step S41, step S42, step S43, step S44, and step S45 described later are performed for all the light sources. The variable m represents the number of times these steps are performed.

Step S40 and step S50 are the step of calculating an image of the estimation sample. The number of images of the estimation sample is equal to the number of captured images. Since the number of captured images is one, the number of images of the estimation sample is also one.

Step S40 includes step S41, step S42, step S43, step S44, step S45, step S46, and step S47.

At step S41, the wavefront $f_{in}^{m}(r)$ incident on the estimation sample 10 is calculated. $f_{in}^{m}(r)$ represents a wavefront of light emanating from the first light source to the $N_{LS}$-th light source.

As described above, it is possible to model an intensity distribution of the pupil of the illumination optical system with a plurality of light sources. The first light source to the $N_{LS}$-th light source are a plurality of modeled light sources. When a first wavefront is the wavefront emanating from a plurality of modeled light sources, the wavefront $f_{in}^m(r)$ represents the first wavefront.

As described above, it is possible to consider each of the minute regions as a point light source. In FIG. 5, illumination light Lm is emitted from the m-th light source. The illumination light Lm is incident on the estimation sample 10.

In this case, the wavefront $f_{in}^m(r)$ is represented by Expression (2) and Expression (3).

$$f_{in}^m(r) = \exp(2\pi i u_m \cdot r) \qquad (2)$$

$$u_m = (\sin\theta_{x,m}, \sin\theta_{y,m}) \qquad (3)$$

where, $\theta_{x,m}$ and $\theta_{y,m}$ each are an incident angle to the estimation sample.

At step S42, the wavefront $g_{out}^m(r)$ emanating from the estimation sample 10 is calculated. In the case of a thin sample, the wavefront $g_{out}^m(r)$ is represented by Expression (4).

$$g_{out}^m(r) = T_s(r) f_{in}^m(r) \qquad (4)$$

where, $T_s(r)$ is the amplitude transmittance of the estimation sample.

The wavefront $g_{out}^m(r)$ is a wavefront after the wavefront $f_{in}^m(r)$ passes through the estimation sample 10. Since the wavefront $f_{in}^m(r)$ represents the first wavefront, the wavefront $g_{out}^m(r)$ represents the second wavefront.

Since the estimation sample 10 is a thin sample, as indicated by Expression (4), it is possible to calculate the wavefront $g_{out}^m(r)$ directly from the wavefront $f_{in}^m(r)$.

At step S43, the wavefront $u^m(r)$ at the acquisition position of a captured image is calculated. The acquisition portion of the captured image is the focus position Fo of the imaging optical system 3 on the sample side when the captured image is acquired.

The wavefront $u^m(r)$ is represented by Expression (5).

$$u^m(r) = P_{-\Delta z1}\{g_{out}^m(r)\} \qquad (5)$$

where, $P_{-\Delta z1}\{\ \}$ is represented by Expression (6), $$P_{-\Delta z1}\{\ \} = F_{2D}^{-1}[2\pi i(-\Delta z1)\sqrt{1/\lambda^2 - |u|^2}]F_{2D} \qquad (6)$$

where, $\Delta z1$ is a distance from a surface of the estimation sample to the acquisition position of the captured image, $\lambda$ is the wavelength, u is a two-dimensional notation of the pupil plane coordinates ($\xi$, $\eta$), $F_{2D}$ is a two-dimensional Fourier transform, and $F_{2D}^{-1}$ is a two-dimensional Fourier inverse transform.

At step S60 described later, the residual is calculated. In calculation of the residual, the captured image and the image of the estimation sample are used. In order to calculate the image of the estimation sample, it is necessary to find a wavefront at the acquisition position of the captured image.

As described above, the distance between the focus position Fo and the surface 6a is $\Delta z1$. When the sign of the distance measured toward the traveling direction of light is positive, the acquisition position of the captured image is a position at a distance from the surface 6a by $-\Delta z1$.

Thus, in the optical system for use in simulation, the acquisition position of the captured image is a position at a distance from a surface 10a of the estimation sample 10 by $-\Delta z1$. In this case, the wavefront at the acquisition position of the captured image is a wavefront at a position at a distance from the surface 10a by $-\Delta z1$.

The wavefront $u^m(r)$ in Expression (5) is a wavefront in which the wavefront $g_{out}^m(r)$ propagates in a direction opposite to the traveling direction of light by $\Delta z1$. This wavefront is a wavefront at a position at a distance from the surface 10a by $-\Delta z1$. Thus, the wavefront $u^m(r)$ in Expression (5) represents a wavefront at the acquisition position of the captured image.

Strictly speaking, the acquisition position of the captured image and the position of the surface 6a are different. However, since the sample 6 is a thin sample, the value of $\Delta z1$ is extremely small. Thus, it is possible to consider the acquisition position of the captured image and the position of the surface 6a to be substantially the same.

The estimation sample 10 is also a thin sample. Thus, it is possible to consider the position of the surface 10a and the position at a distance from the surface 10a by $-\Delta z1$ to be substantially the same. In other words, it is possible to consider the position of the wavefront $g_{out}^m(r)$ and the position of the wavefront $u^m(r)$ to be substantially the same. In this case, it is also possible to use the wavefront $g_{out}^m(r)$ instead of the wavefront $u^m(r)$.

At step S44, the wavefront $u_{img}^m(r)$ at the imaging plane is calculated. The wavefront $u^m(r)$ is propagated to the imaging plane IP. At this moment, the wavefront $u^m(r)$ passes through the imaging optical system 3. The imaging optical system 3 forms a Fourier optical system. Thus, as indicated by Expression (7), it is possible to calculate the wavefront $u_{img}^m(r)$ at the imaging plane IP using the wavefront $u^m(r)$ and the pupil function P(u) of the imaging optical system.

$$u_{img}^m(r) = F_{2D}^{-1}[F_{2D}\{u^m(r)\} \times P(u)] \qquad (7)$$

At step S45, the wavefront $u_{img}^m(r)$ is squared. The wavefront $u_{img}^m(r)$ represents amplitude of light. Thus, light intensity is calculated by squaring the wavefront $u_{img}^m(r)$.

$|u_{img}^m(r)|^2$ represents a light intensity distribution at the imaging plane IP. Supposing that a first intensity distribution is a light intensity distribution at the imaging position of the imaging optical system, $|u_{img}^m(r)|^2$ represents the first intensity distribution at the imaging position of the imaging optical system.

The wavefront $f_{in}^m(r)$, the wavefront $g_{out}^m(r)$, the wavefront $u^m(r)$, and the wavefront $u_{img}^m(r)$ represent the wavefronts generated by illumination light emitted from the m-th light source, that is, illumination light emitted from one light source.

An image $I_{est}(r)$ of the estimation sample is generated by illumination light emitted from all the light sources. Thus, it is necessary to find the wavefront $f_{in}^m(r)$, the wavefront $g_{out}^m(r)$, the wavefront $u^m(r)$, and the wavefront $u_{img}^m(r)$ for all the light sources.

At step S46, it is judged whether the value of the variable m agrees with the number of light sources $N_{LS}$. If the judgement result is NO, step S47 is performed. If the judgement result is YES, step S50 is performed.

(If the Judgement Result is NO: $m \neq N_{LS}$)

If the judgement result is NO, at step S47, 1 is added to the value of the variable m. When step S47 is finished, the process returns to step S41.

At step S47, the value of the variable m has increased by one. Thus, for another light source, the wavefront $f_{in}^m(r)$ is calculated at step S41, the wavefront $g_{out}{}^m(r)$ is calculated at step S42, the wavefront $u^m(r)$ is calculated at step S43, the wavefront $u_{img}{}^m(r)$ is calculated at step S44, and $|u_{img}{}^m(r)|^2$ is calculated at step S45.

Step S41, step S42, step S43, step S44, and step S45 are repeatedly performed until $|u_{img}{}^m(r)|^2$ is found for all the light sources.

(If the Judgement Result is YES: m=$N_{LS}$)

If the judgement result is YES, at step S50, $|u_{img}{}^m(r)|^2$ are summed. As a result, the image $I_{est}(r)$ of the estimation sample is calculated. The image $I_{est}(r)$ of the estimation sample is represented by Expression (8).

$$I_{est}(r) = \sum_m |u_{img}^x(r)|^2 \tag{8}$$

Figure 6:
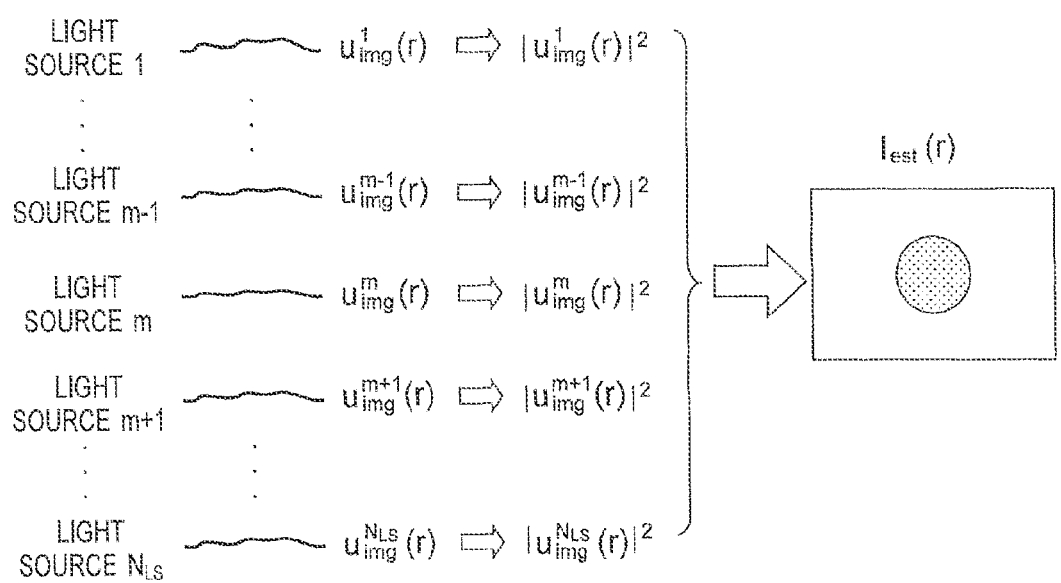
FIG. 6 is a diagram illustrating an image of an estimation sample.

FIG. 6 is a diagram illustrating an image of the estimation sample. The image $I_{est}(r)$ of the estimation sample is an image in a case where the wavefront $u_{img}{}^m(r)$ is found for all the light sources. As illustrated in FIG. 6, the wavefront $u_{img}{}^m(r)$ is calculated for each light source, $|u_{img}{}^m(r)|^2$ is calculated from the wavefront $u_{img}{}^m(r)$, and all $|u_{img}{}^m(r)|^2$ are summed. As a result, the image $I_{est}(r)$ of the estimation sample is calculated.

At step S60, the residual is calculated. The residual is represented by Expression (9). As indicated by Expression (9), the residual is calculated from the captured image $I_{mea}(r)$ and the image $I_{est}(r)$ of the estimation sample.

$$\sum_r |I_{mea}(r) - I_{est}(r)|_{12}^2 \tag{9}$$

Expression (9) represents a matrix norm. The norm is represented by Expression (10).

$$|(x)|_{12}{}^2 = |(x_1, x_2, \ldots, x_N)|_{12}{}^2 = x_1{}^2 + x_2{}^2 \ldots + x_N{}^2 \tag{10}$$

At step S70, the residual is compared with a threshold value. If the judgement result is NO, step S80 is performed. If the judgement result is YES, step S110 is performed.

(If the Judgement Result is NO: Residual Threshold Value)

At step S80, the value of the variable m is initialized. Step S91 and step S92 described later are performed for all the light sources. The variable m represents the number of times these steps are performed.

Step S90 is the step of optimizing a refractive index distribution of the estimation sample.

Step S90 includes step S91, step S92, step S93, and step S94.

At step S91, a wavefront $u'^m(r)$ is calculated. In calculation of the wavefront $u'^m(r)$, the captured image $I_{mea}(r)$ and the image $I_{est}(r)$ of the estimation sample are used. Furthermore, the wavefront $u'^m(r)$ is a wavefront at the acquisition position of the captured image.

The wavefront $u'^m(r)$ is represented by Expression (11).

$$u'^m(r) = u^m(r) \frac{I_{mea}(r)}{I_{est}(r)} \tag{11}$$

Figure 7:
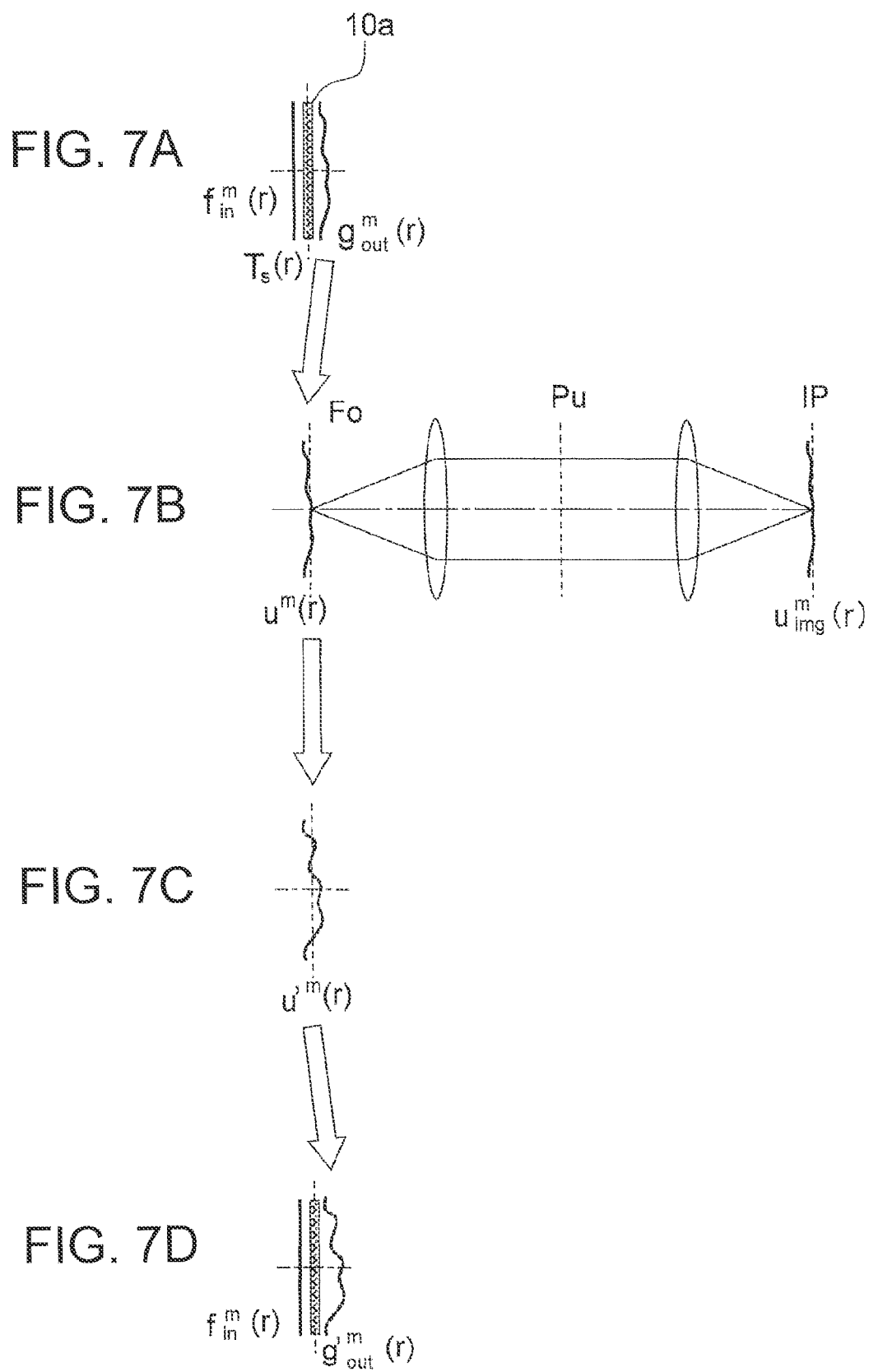
FIG. 7A, FIG. 7B, FIG. 7C, and FIG. 7D are diagrams illustrating correction of wavefronts.

FIG. 7A, FIG. 7B, FIG. 7C, and FIG. 7D are diagrams illustrating correction of wavefronts. FIG. 7A is a diagram illustrating a wavefront before correction emanating from the estimation sample. FIG. 7B is a diagram illustrating a wavefront before correction at the acquisition position of the captured image. FIG. 7C is a diagram illustrating a wavefront after correction at the acquisition position of the captured image. FIG. 7D is a diagram illustrating a wavefront after correction emanating from the estimation sample.

As illustrated in FIG. 6, the image $I_{est}(r)$ of the estimation sample is calculated based on the wavefront $u_{img}{}^m(r)$. Furthermore, as illustrated in FIG. 6 and FIG. 7B, the wavefront $u_{img}{}^m(r)$ is calculated based on the wavefront $u^m(r)$.

As illustrated in FIG. 7A, the amplitude transmittance $T_s(r)$ is used in calculation of the wavefront $u^m(r)$. The amplitude transmittance $T_s(r)$ is an estimated amplitude transmittance. When step S90 is performed the first time, this amplitude transmittance $T_s(r)$ is different from an amplitude transmittance of the sample 6.

As the difference between the amplitude transmittance $T_s(r)$ and the amplitude transmittance of the sample 6 increases, the difference between the image $I_{est}(r)$ of the estimation sample and the captured image $I_{mea}(r)$ also increases. Thus, it is possible to consider the difference between the image $I_{est}(r)$ of the estimation sample and the captured image $I_{mea}(r)$ to reflect the difference between the amplitude transmittance $T_s(r)$ and the amplitude transmittance of the sample 6.

Then, as indicated by Expression (11), the wavefront $u^m(r)$ is corrected using the image $I_{est}(r)$ of the estimation sample and the captured image $I_{mea}(r)$. As a result, as illustrated in FIG. 7C, the wavefront after correction, that is, the wavefront $u'^m(r)$ is obtained.

By using the wavefront $u'^m(r)$, it is possible to calculate a new amplitude transmittance $T_s(r)$. The wavefront $u'^m(r)$ is different from the wavefront $u^m(r)$. Thus, the new amplitude transmittance $T_s(r)$ is different from the amplitude transmittance when the wavefront $u^m(r)$ is calculated.

As just described, it is possible to calculate the amplitude transmittance $T_s(r)$ using the wavefront $u'^m(r)$. However, as illustrated in FIG. 7A, the wavefront $g_{out}{}^m(r)$ is necessary for calculation of the amplitude transmittance $T_s(r)$.

As illustrated in FIG. 7A and FIG. 7C, the position of the wavefront $u'^m(r)$ is different from the position of the wavefront $g_{out}{}^m(r)$. Thus, in order to calculate the amplitude transmittance $T_s(r)$, as illustrated in FIG. 7D, a wavefront $g'_{out}{}^m(r)$ is necessary.

The wavefront $g'_{out}{}^m(r)$ is represented by Expression (12). Since the wavefront $u'^m(r)$ is the wavefront after correction, the wavefront $g'_{out}{}^m(r)$ is also the wavefront after correction.

$$g'_{out}{}^m(t) = P_{\Delta z1}\{u'^m(r)\} \tag{12}$$

As described above, the acquisition position of the captured image is a position at a distance from the surface 10a by $-\Delta z1$. In other words, the position of the surface 10a is a position at a distance from the acquisition position of the captured image by $\Delta z1$. Thus, a wavefront at the position of the surface 10a is a wavefront at a position at a distance from the acquisition position of the captured image by $\Delta z1$.

The wavefront $g'_{out}{}^m(r)$ in Expression (12) is a wavefront in which the wavefront $u'^m(r)$ propagates by $\Delta z1$ in the traveling direction of light. This wavefront is a wavefront at a position at a distance from the acquisition position of the captured image by $\Delta z1$. Thus, the wavefront $g'_{out}{}^m(r)$ in Expression (12) represents a wavefront at the position of the surface 10a.

The wavefront at the position of the surface 10a is a wavefront after $f_{in}{}^m(r)$ passes through the estimation sample 10. As described above, $f_{in}{}^m(r)$ represents the first wavefront. Supposing that the second wavefront is a wavefront after the first wavefront passes through the estimation sample, the wavefront $g'^{m}_{out}(r)$ represents the second wavefront.

As described above, the value of $\Delta z1$ is extremely small. Furthermore, the estimation sample 10 is a thin sample. Therefore, it is possible to consider the acquisition position of the captured image and the position at a distance from the acquisition position of the captured image by $\Delta z1$ to be substantially the same. In other words, it is possible to consider the position of the wavefront $u'''(r)$ and the position of the wavefront $g^{m}_{out}(r)$ to be substantially the same. In this case, it is also possible to use the wavefront $u'''(r)$ instead of the wavefront $g'^{m}_{out}(r)$.

At step S92, a gradient $\Delta T_s^m(r)$ of the sample is calculated. The gradient $\Delta T_s^m$ of the sample is represented by Expression (13). For example, it is possible to use the gradient descent method for calculation of the gradient $\Delta T_s^m(r)$ of the sample.

$$\Delta T_s^m(r) = \frac{f_{in}^m(r) \cdot f_{in}^{*m}(r)(g'^{m}_{out}(r) - g^{m}_{out}(r))}{|T_s(r)|_{max}(|T_s(r)|^2 + \delta)} \quad (13)$$

where f* is a complex conjugate of f, and

δ is a normalizing constant for preventing division by zero.

As illustrated in FIG. 7A, the amplitude transmittance $T_s(r)$ is used for calculation of the wavefront $g^{m}_{out}(r)$. The amplitude transmittance $T_s(r)$ is the estimated amplitude transmittance. Thus, this amplitude transmittance $T_s(r)$ is different from the amplitude transmittance of the sample 6.

As the difference between the amplitude transmittance $T_s(r)$ and the amplitude transmittance of the sample 6 increases, the difference between the wavefront $g^{m}_{out}(r)$ and the wavefront $g'^{m}_{out}(r)$ also increases. Thus, it is possible to consider the difference between the wavefront $g^{m}_{out}(r)$ and the wavefront $g'^{m}_{out}(r)$ to reflect the difference between the amplitude transmittance $T_s(r)$ and the amplitude transmittance of the sample 6.

The wavefront $f_{in}^m(r)$, the amplitude transmittance $T_s(r)$, the wavefront $g^{m}_{out}(r)$, and the wavefront $g'^{m}_{out}(r)$ are known. Then, as indicated by Expression (13), it is possible to calculate the gradient $\Delta T_s^m(r)$ of the sample using the wavefront $f_{in}^m(r)$, the amplitude transmittance $T_s(r)$, the wavefront $g^{m}_{out}(r)$, and the wavefront $g'^{m}_{out}(r)$.

Figure 8:
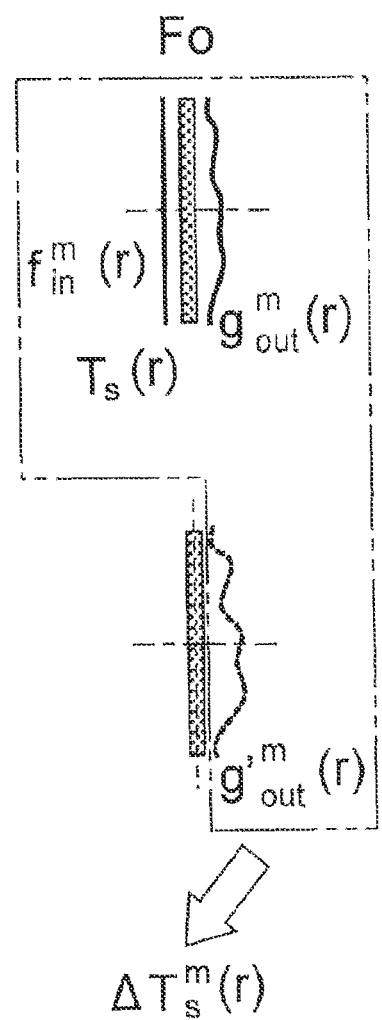
FIG. 8 is a diagram illustrating a gradient of a sample.

FIG. 8 is a diagram illustrating a gradient of a sample.

The gradient $\Delta T_s^m(r)$ of the sample obtained at step S92 represents a gradient of the sample in illumination light emitted from one light source. The gradient $\Delta T_s^m(r)$ of the sample is judged by illumination light emitted from all the light sources. Thus, it is necessary to find the gradient $\Delta T_s^m(r)$ of the sample for all the light sources.

At step S93, it is judged whether the value of the variable m agrees with the number of light sources $N_{LS}$. If the judgement result is NO, step S94 is performed. If the judgement result is YES, step S100 is performed.

(If the Judgement Result is NO: m≠$N_{LS}$)

If the judgement result is NO, at step S94, 1 is added to the value of the variable m. When step S94 is finished, the process returns to step S91.

At step S94, the value of the variable m has increased by one. Therefore, for another light source, the wavefront $u'''(r)$ is calculated at step S91, and the gradient $\Delta T_s^m(r)$ of the sample is calculated at step S92.

Step S91 and step S92 are repeatedly performed until the gradient $\Delta T_s^m(r)$ of the sample is found for all the light sources.

FIG. 9 is a diagram illustrating a gradient of a sample. In FIG. 9, the gradient $\Delta T_s^m(r)$ of the sample is found for all the light sources.

(If the Judgement Result is YES: m=$N_{LS}$)

If the judgement result is YES, at step S100, the amplitude transmittance $T_s(r)$ is updated. Step S100 is the step of updating the estimation sample.

The updated amplitude transmittance $T_s(r)$ is represented by Expression (14).

$$T_s(r) = T_s(r) + \alpha \sum_m T_s^m(r) \quad (14)$$

where

α is a correction coefficient for the gradient of the sample.

Further, when the sample 6 is considered as a perfect phase object with no absorption, it is possible to further update the amplitude transmittance $T_s(r)$ using Expression (15).

$$T_s(r) \frac{T_s(r)}{|T_s(r)|} \quad (15)$$

When step S100 is finished, the process returns to step S30. Step S30 to step S100 are performed with the updated amplitude transmittance $T_s(r)$.

Step S30 to step S100 are repeatedly performed whereby the updated amplitude transmittance $T_s(r)$ gradually approaches the amplitude transmittance of the sample 6. In other words, the residual becomes smaller. Eventually, the residual becomes smaller than the threshold value.

(If the Judgement Result is YES: Residual<Threshold Value)

At step 110, the refractive index distribution of the estimation sample is calculated. The obtained amplitude transmittance $T_s(r)$ is identical or substantially identical with the amplitude transmittance of the sample 6. The refractive index distribution n(r) is found from the obtained amplitude transmittance $T_s(r)$ and Expression (1).

It is possible to reconstruct the structure of the estimation sample by using the refractive index distribution n(r) obtained at step S110. It is possible to output the reconstructed structure of the estimation sample to, for example, a display device. The estimation sample 10 is a thin sample. In the first simulation, it is possible to reconstruct the structure of a thin sample.

As described above, the amplitude transmittance $T_s(r)$ obtained at step S110 is identical or substantially identical with the amplitude transmittance of the sample 6. In this case, it is also possible to consider the refractive index distribution n(r) to be identical or substantially identical with the refractive index distribution of the sample 6. Thus, it is possible to consider the reconstructed structure of the estimation sample 10 to be identical or substantially identical with the structure of the sample 6.

In the first simulation, step S40, step S50, and step S90 are repeatedly performed. As a result, the amplitude transmittance $T_s(r)$ is updated. As described above, step S40 and step S50 are the step of calculating an image of the estimation sample. Step S90 is the step of optimizing a refractive index distribution of the estimation sample.

The amplitude transmittance $T_s(r)$ represents the estimation sample. Thus, the step of calculating an image of the estimation sample and the step of optimizing a refractive index distribution of the estimation sample are repeatedly performed whereby the estimation sample is updated.

It is preferable that the refractive index distribution estimating system of the present embodiment further include a driving mechanism configured to change a distance between a focus position of the imaging optical system and a position of the sample in an optical axis direction of the imaging optical system. A plurality of captured images of the sample corresponding to a plurality of distances are acquired by changing the distance using the driving mechanism, a plurality of images of the estimation sample corresponding to the distances are calculated, and the refractive index distribution of the estimation sample is optimized in each of the distances.

Figure 10A:
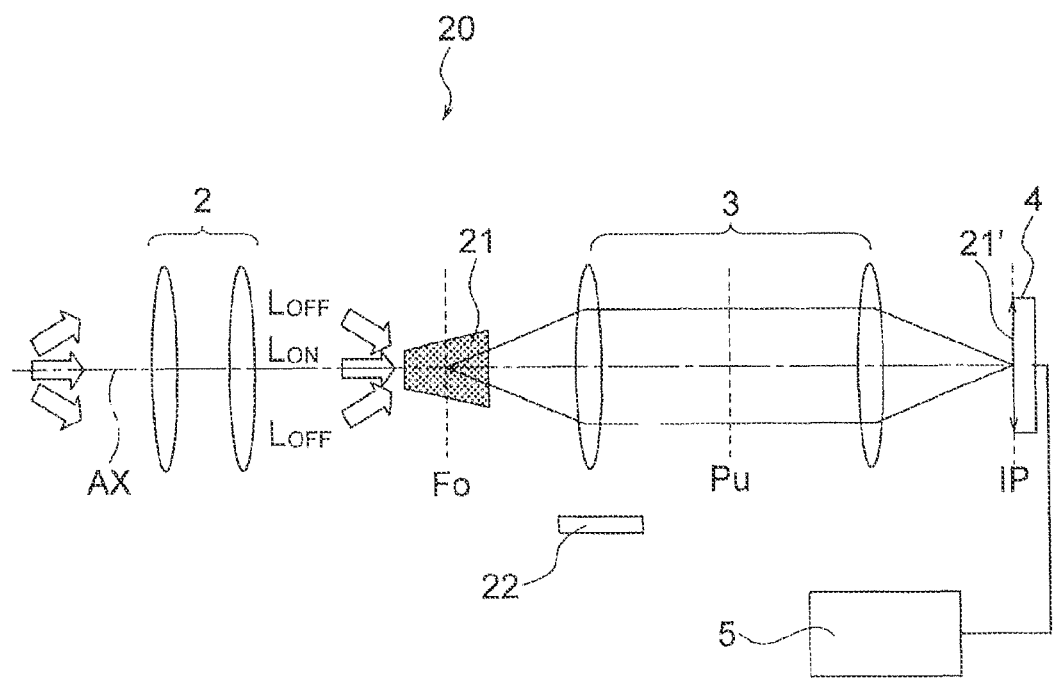
FIG. 10A and FIG. 10B are diagrams illustrating a refractive index distribution estimating system of the present embodiment and illumination light.
Figure 10B:
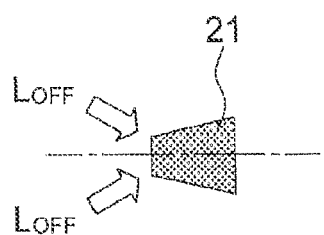

FIG. 10A and FIG. 10B are diagrams illustrating the refractive index distribution estimating system of the present embodiment and illumination light. FIG. 10A is a diagram illustrating the refractive index distribution estimating system. FIG. 10B is a diagram illustrating illumination light. The same configuration as that in FIG. 1A is denoted by the same numeral and a description thereof is omitted.

A sample 21 is a thick sample. Light rays are simultaneously incident on the sample 21 from a plurality of directions. In FIG. 10A, a light ray $L_{ON}$ and a light ray $L_{OFF}$ are illustrated. As illustrated in FIG. 10B, the light ray $L_{OFF}$ alone may be used for illumination.

Light emanating from the sample 21 is collected on the imaging plane IP by the imaging optical system 3. An optical image 21' is formed on the imaging plane IP. The optical image 21' is an optical image of the sample 21.

A refractive index distribution estimating system 20 includes a movable stage 22. The movable stage 22 moves in the direction of the optical axis AX.

As described above, a captured image is used for optimization of the refractive index distribution of the estimation sample. Since the sample 21 is a thick sample, a plurality of captured images are acquired. In order to acquire a plurality of captured images, the sample 21 is fixed and the focus position of the imaging optical system 3 is moved by the movable stage 22.

The imaging optical system 3 includes, for example, an infinity-corrected objective lens and a tube lens. In this case, by moving the objective lens, it is possible to move the focus position of the imaging optical system 3. The sample 21 may be moved while the imaging optical system 3 and the image pickup element 4 are fixed.

A case where four captured images are acquired will be described below.

Figure 11A:
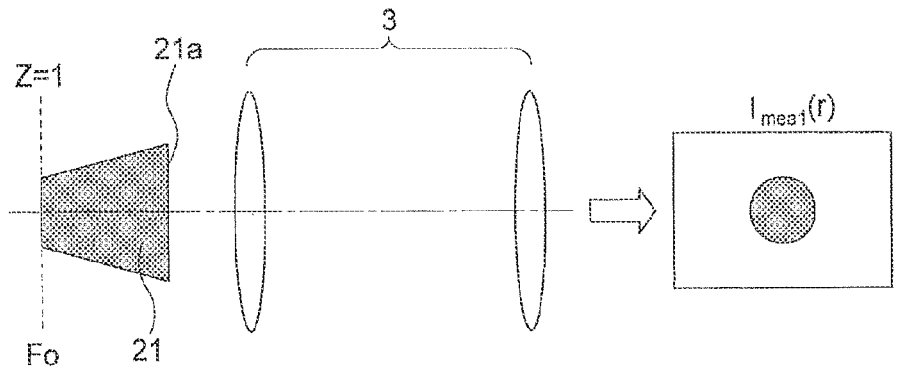
FIG. 11A, FIG. 11B, FIG. 11C, and FIG. 11D are diagrams illustrating a captured image.
Figure 11B:
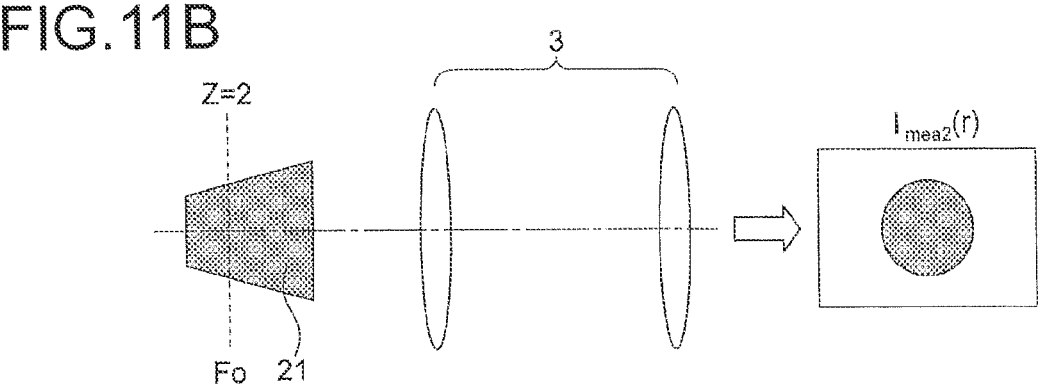
Figure 11C:
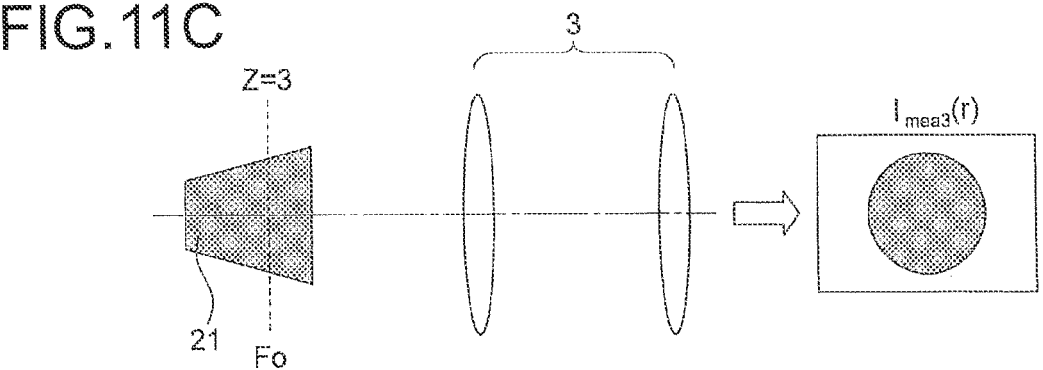
Figure 11D:
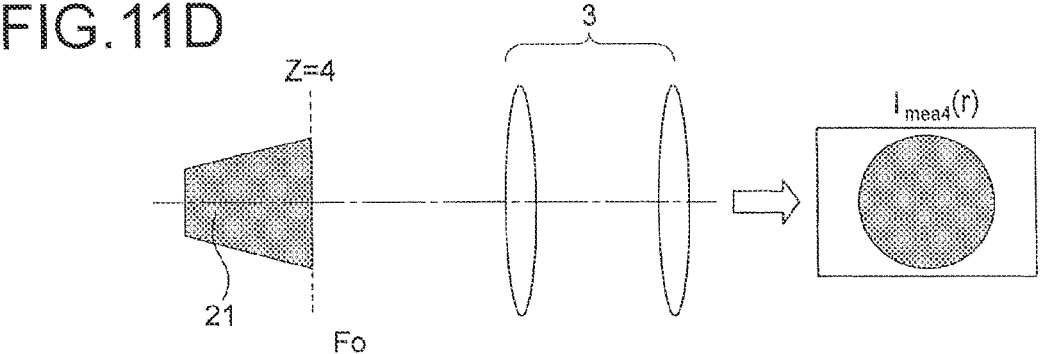

FIG. 11A, FIG. 11B, FIG. 11C, and FIG. 11D are diagrams illustrating a captured image. FIG. 11A is a diagram illustrating a captured image at a first position. FIG. 11B is a diagram illustrating a captured image at a second position. FIG. 11C is a diagram illustrating a captured image at a third position. FIG. 11D is a diagram illustrating a captured image at a fourth position.

The focus position Fo relative to the sample 21 is changed by changing a distance between the imaging optical system 3 and the sample 21. Here, the focus position Fo relative to the sample 21 is changed four times. Thus, the following four captured images are acquired.

Captured image $I_{mea1}(r)$: an image at a position where the distance from a surface 21a is $3 \times \Delta z$.

Captured image $I_{mea2}(r)$: an image at a position where the distance from the surface 21a is $2 \times \Delta z$.

Captured image $I_{mea3}(r)$: an image at a position where the distance from the surface 21a is $\Delta z$.

Captured image $I_{mea4}(r)$: an image at the surface 21a.

The captured image $I_{mea1}(r)$, the captured image $I_{mea2}(r)$, the captured image $I_{mea3}(r)$, and the captured image $I_{mea4}(r)$ are input to the processor 5. In the processor 5, simulation of the image of the estimation sample is performed using four captured images.

Figure 12:
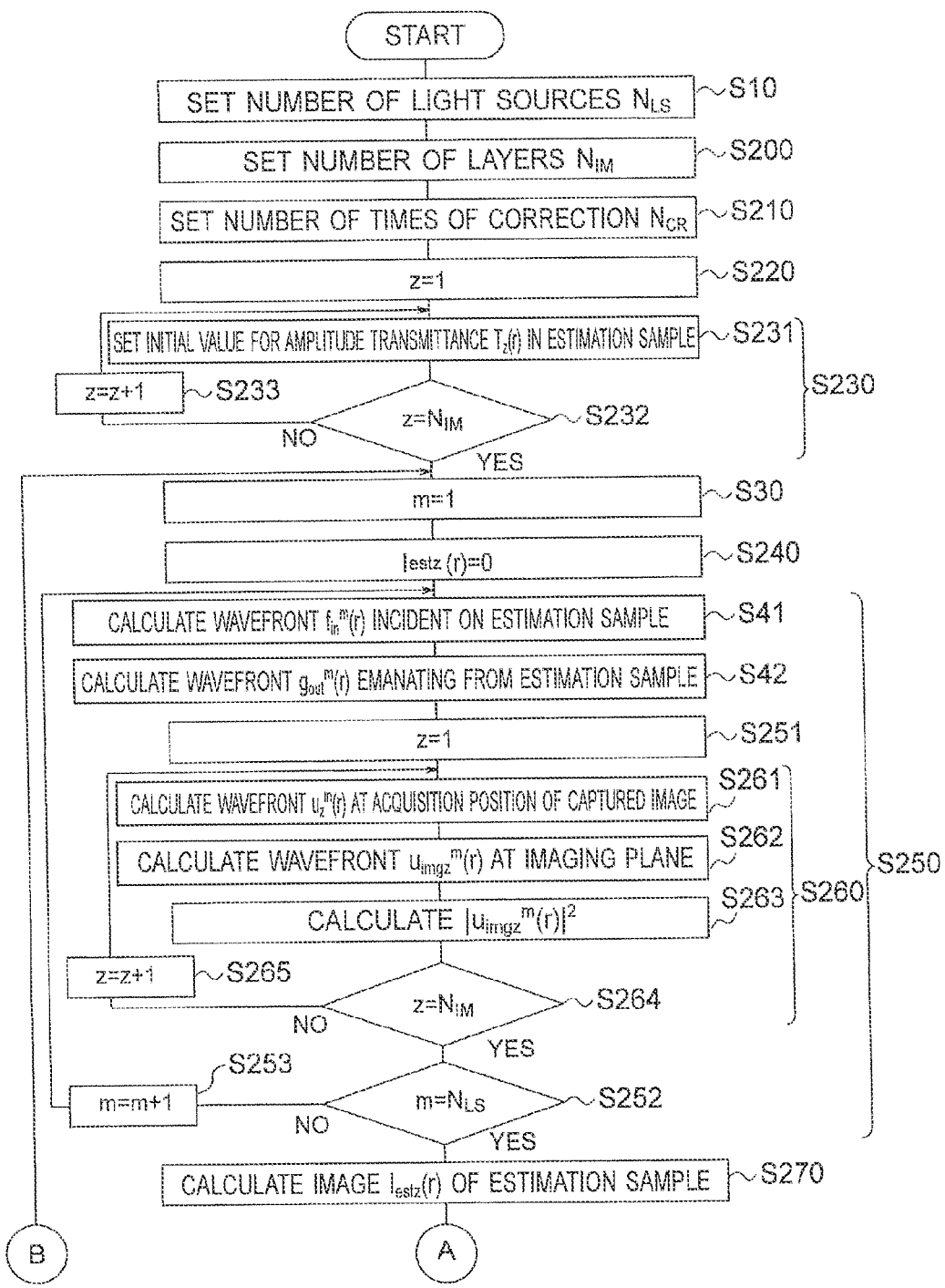
FIG. 12 is a flowchart of a second simulation.
Figure 13:
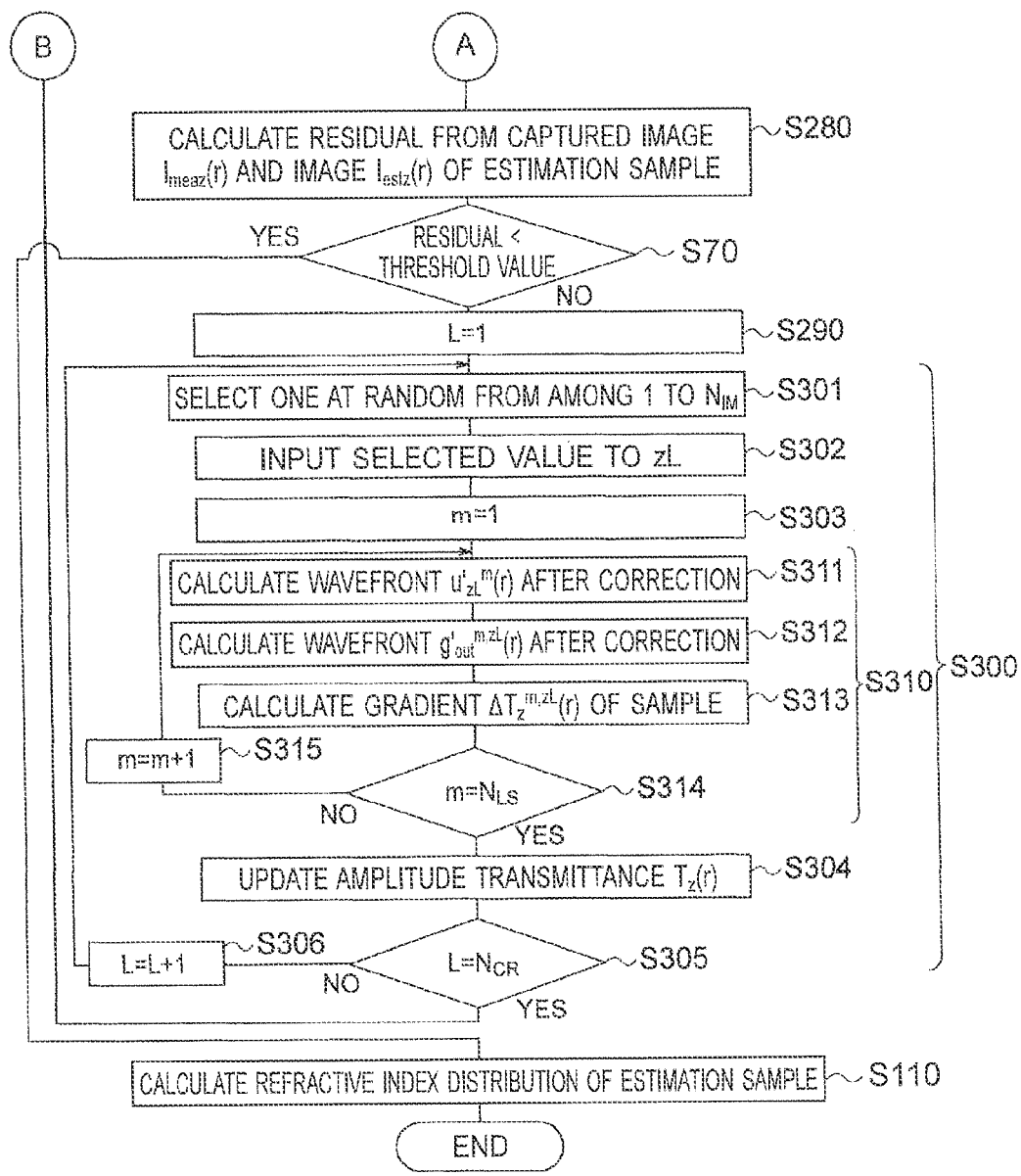
FIG. 13 is a flowchart of the second simulation.

FIG. 12 and FIG. 13 are flowcharts of the second simulation. The same process as the process in the first flowchart is denoted by the same numeral and a description thereof is omitted.

Figure 14:
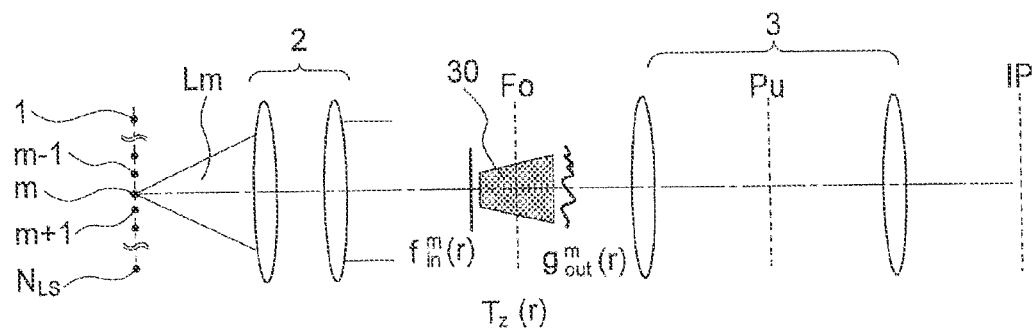
FIG. 14 is a diagram illustrating an optical system for use in simulation.

FIG. 14 is a diagram illustrating an optical system for use in simulation. The same configuration as that in FIG. 5 is denoted by the same numeral and a description thereof is omitted.

The optical system for use in simulation is the same as the measurement optical system that acquires the captured image $I_{mea1}(r)$, the captured image $I_{mea2}(r)$, the captured image $I_{mea3}(r)$, and the captured image $I_{mea4}(r)$. In simulation, an estimation sample 30 is used instead of the sample 21.

FIG. 14 illustrates the estimation sample 30, the wavefront $f_{in}^m(r)$, the amplitude transmittance $T_z(r)$, and the wavefront $g_{out}^m(r)$.

When the estimation sample is a thin sample, as indicated by Expression (4), it is possible to calculate the wavefront $g_{out}^m(r)$ directly from the wavefront $f_{in}^m(r)$. However, when the estimation sample is a thick sample, it is difficult to calculate the wavefront $g_{out}^m(r)$ directly from the wavefront $f_{in}^m(r)$.

The estimation sample 30 is a thick sample. In this case, the estimation sample 30 is replaced by a plurality of thin layers along the optical axis direction. Then, for each of the thin layers, the wavefronts on both sides of the layer are calculated.

Figure 15:
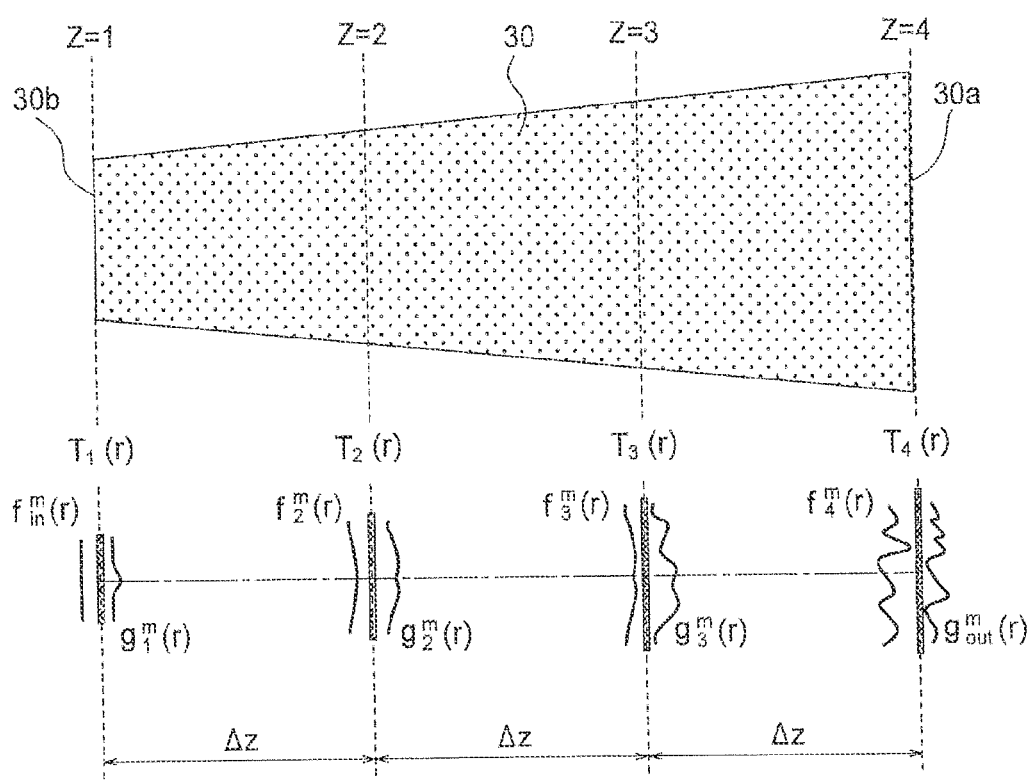
FIG. 15 is a diagram illustrating wavefronts in each layer.

FIG. 15 is a diagram illustrating wavefronts in each layer. The calculation of wavefronts will be described later. It is possible to set the same number of layers as the number of acquired images. However, the number of layers may be set to be larger than the number of acquired images. In FIG. 15, the number of layers is the same as the number of acquired images.

In FIG. 15, the position Z=1 is a position of a first layer, the position Z=2 is a position of a second layer, the position Z=3 is a position of a third layer, and the position Z=4 is a position of a fourth layer.

Referring to FIG. 12 and FIG. 13, the simulation will be described.

At step S10, the number of light sources $N_{LS}$ is set.

At step S200, the number of layers $N_{IM}$ is set. The estimation sample 30 is a thick sample. Thus, as described above, the estimation sample 30 is replaced by a plurality of thin layers. The number of layers $N_{IM}$ represents the number of thin layers.

In the sample 21, captured images are acquired at a plurality of positions. It is possible to set the same number of layers $N_{IM}$ as the number of positions at which captured images are acquired. When the focus position Fo relative to the sample 21 is changed four times, $N_{IM}=4$.

The numerals from 1 to $N_{IM}$ represent the positions of thin layers. For example, when $N_{IM}=4$, the numeral 1 represents the position of the first layer, the numeral 2 represents the position of the second layer, the numeral 3 represents the position of the third layer, and the numeral 4 represents the position of the fourth layer.

The calculation of the image of the estimation sample is performed by simulation. Therefore, it is possible to set the number of layers $N_{IM}$ freely. For example, it is possible to set a larger number of layers $N_{IM}$ than the number of positions at which captured images are acquired.

For example, when $N_{IM}=7$, the number of thin layers is seven. In this case, seven images of the estimation sample are calculated. In simulation, as described later, captured images and images of the estimation sample in thin layers are used. Thus, the seven positions at which the images of the estimation sample are calculated include four positions at which captured images are acquired.

It is possible to set the relation between the seven positions and the captured images, for example, as follow.

The numeral 1 represents the position of the first layer. At this position, the captured image $I_{mea1}(r)$ is acquired. Furthermore, at this position, the image of the estimation sample in the first layer is calculated. Thus, the image of the estimation sample in the first layer and the captured image $I_{mea1}(r)$ are used in the step described later.

The numeral 2 represents the position of the second layer. There is no captured image acquired at this position.

The numeral 3 represents the position of the third layer. At this position, the captured image $I_{mea2}(r)$ is acquired. Furthermore, at this position, the image of the estimation sample in the third layer is calculated. Thus, the image of the estimation sample in the third layer and the captured image $I_{mea2}(r)$ are used in the step described later.

The numeral 4 represents the position of the fourth layer. There is no captured image acquired at this position.

The numeral 5 represents the position of the fifth layer. At this position, the captured image $I_{mea3}(r)$ is acquired. Furthermore, at this position, the image of the estimation sample in the fifth layer is calculated. Thus, the image of the estimation sample in the fifth layer and the captured image $I_{mea3}(r)$ are used in the step described later.

The numeral 6 represents the position of the sixth layer. There is no captured image acquired at this position.

The numeral 7 represents the position of the seventh layer. At this position, the captured image $I_{mea4}(r)$ is acquired. Furthermore, at this position, the image of the estimation sample in the seventh layer is calculated. Thus, the image of the estimation sample in the seventh layer and the captured image $I_{mea4}(r)$ are used in the step described later.

At step S210, the number of times of correction $N_{CR}$ is set.

At step S220, the value of a variable z is initialized. Step S231 described later is performed for all the acquisition positions. The variable z represents the number of times step S231 is performed.

Step S230 is the step of estimating an estimation sample. In the sample 21, four captured images are acquired. As described above, the estimation sample 30 is replaced by four thin layers. Thus, the setting of an initial value of the amplitude transmittance is performed four times.

Step S230 includes step S231, step S232, and step S233.

At step S231, an initial value is set for the amplitude transmittance $T_z(r)$ in the estimation sample 30.

In the setting of an initial value, the transport of intensity equation may be used. The transport of intensity equation is described, for example, in the following literature.

M. R. Teague, "Deterministic phase retrieval: a Greens function solution", J. Opt. Soc. Am. 73, 1434-1441(1983)

The transport of intensity equation at a focus position Z0 is represented by Expression (16).

$$\nabla^2 \Phi_{z0}(r) = -\frac{k}{I_{z0}} \frac{\delta I mea_{z0}(r)}{\delta z} \quad (16)$$

where
$\nabla^2$ is the second-order Laplacian,
k is the wave number,
$\varphi_{Z0}(r)$ is a phase distribution of the sample at the imaging plane,
$I_{Z0}$ is average light intensity of the optical image, and
$\delta I_{meaZ0}(r)/\delta_Z$ is a differential image between two defocus images at a distance from the imaging plane by $\pm\Delta z$.

Using Expression (16), it is possible to easily find the phase distribution $\varphi_{Z0}(r)$ of the sample from a focus image and two defocus images.

However, it is not possible to measure the phase if the difference in light intensity at the identical point between two defocus images is zero or extremely small. Even with partial coherent illumination, when a numerical aperture of illumination light is small, this difference in light intensity is zero or extremely small. Therefore, in such a case, it is difficult to set an initial value using the transport of intensity equation.

As described above, the phase distribution $\varphi_{Z0}(r)$ is calculated from a focus image and two defocus images. The focus image is acquired, for example, by moving the objective lens at regular intervals in the optical axis direction. In this case, a plurality of focus images are discretely acquired along the optical axis. Thus, two defocus images are also discretely acquired.

The phase distribution $\varphi_{Z0}(r)$ represented by Expression (16) is a phase distribution in a plane orthogonal to the optical axis. Since the focus image and two defocus images are discretely acquired, the planes representing the phase distribution $\varphi_{Z0}(r)$ are also discretely positioned along the optical axis.

As indicated by Expression (17), it is possible to convert a phase distribution $\varphi_z(r)$ into the amplitude transmittance $T_s(r)$. In this way, it is possible to set an initial value for the amplitude transmittance $T_z(r)$.

$$T_z(r) = \exp(i\Phi_z(r)) \quad (17)$$

It is possible to use the phase distribution $\varphi_{Z0}$ obtained by the transport of intensity equation for the phase distribution $\varphi_z(r)$. It is possible to set an initial value using the transport of intensity equation. When estimation of the initial value is difficult, for example, $T_z(r)=1$ may be set.

At step S232, it is judged whether the value of the variable z agrees with the number of acquisition positions $N_{IM}$. If the judgement result is NO, step S233 is performed. If the judgement result is YES, step S30 is performed.

(If the Judgement Result is NO: $z \neq N_{IM}$)

If the judgement result is NO, at step S233, 1 is added to the value of the variable z. When step S233 is finished, the process returns to step S231.

At step S233, the value of the variable z has increased by one. Therefore, for another acquisition position, an initial value is set for the amplitude transmittance $T_z(r)$ at step S231.

Step S231 is repeatedly performed until an initial value is set for all the acquisition positions.

(If the Judgement Result is YES: $z = N_{IM}$)

At step S30, the value of the variable m is initialized. Step S240, step S41, step S42, step S251, and step S260 described later are performed for all the light sources. The variable m represents the number of times these steps are performed.

At step S240, the value of a function $I_{estz}(r)$ is initialized. $I_{estz}(r)$ represents the image of the estimation sample 30. As described above, the image of the estimation sample 30 is replaced by four thin layers. Thus, $I_{estz}(r)$ represents the image of a thin layer.

Step S250 and step S270 are the step of calculating an image of the estimation sample. The number of images of the estimation sample is equal to the number of captured images. Since the number of captured images is four, the number of images of the estimation sample is also four.

Step S250 includes step S41, step S42, step S251, step S252, step S253, and step S260.

At step S41, the wavefront $f_{in}^m(r)$ incident on the estimation sample 30 is calculated. The wavefront $f_{in}^m(r)$ is represented by Expressions (2) and (3) above.

At step S42, the wavefront $g_{out}^m(r)$ emanating from the estimation sample 30 is calculated. The wavefront $g_{out}^m(r)$ is calculated based on the wavefront $f_{in}^m(r)$. The estimation sample 30 is replaced by four thin layers. Thus, the wavefront is calculated for each of the thin layers.

In FIG. 15, the position Z=1 is the position of a first layer, the position Z=2 is the position of a second layer, the position Z=3 is the position of a third layer, and the position Z=4 is the position of a fourth layer.

The four thin layers are arranged at regular intervals. The distance between adjacent two layers is $\Delta z$. The wavefront propagates between two layers. Thus, $\Delta z$ represents a propagation distance.

A wavefront $f_1^m(r)$ in the first layer is represented by Expression (18) and Expression (3).

$$f_1^m(r) = \exp(2\pi i u_m \cdot r) \tag{18}$$

The position of the first layer agrees with the position of a surface 30b of the estimation sample 30. The wavefront $f_{in}^m(r)$ is incident on the surface 30b. Thus, the wavefront $f_1^m(r)$ represents the wavefront $f_{in}^m(r)$. In FIG. 15, the wavefront $f_{in}^m(r)$ is illustrated instead of the wavefront $f_1^m(r)$.

A wavefront $g_1^m(r)$ in the first layer is represented by Expression (19).

$$g_1^m(r) = T_1(r) f_1^m(r) \tag{19}$$

where $T_1(r)$ is an amplitude transmittance in the first layer.

A wavefront $f_2^m(r)$ in the second layer is a wavefront when the wavefront $g_1^m(r)$ propagates by $\Delta z$. The wavefront $f_2^m(r)$ is represented by Expression (20). By setting $\Delta D = \Delta z$ in Expression (20), it is possible to calculate the wavefront $f_2^m(r)$.

$$f_2^m(r) = P_{\Delta D}\{g_1^m(r)\} \tag{20}$$

where, $P_{\Delta D}\{\ \}$ is represented by Expression (21), $$P_{\Delta D}\{\ \} = F_{2D}^{-1}[2\pi i(\Delta D)\sqrt{1/\lambda^2 - |u|^2}]F_{2D} \tag{21}$$

where, $\Delta D$ is a distance between adjacent two layers, $\lambda$ is the wavelength, u is the two-dimensional notation of the pupil plane coordinates $(\xi, \eta)$, $F_{2D}$ is the two-dimensional Fourier transform, and $F_{2D}^{-1}$ is the two-dimensional Fourier inverse transform.

A wavefront $g_2^m(r)$ in the second layer is represented by Expression (22).

$$g_2^m(r) = T_2(r) f_2^m(r) \tag{22}$$

where, $T_2(r)$ is an amplitude transmittance in the second layer.

A wavefront $f_3^m(r)$ in the third layer is a wavefront when the wavefront $g_2^m(r)$ propagates by $\Delta z$. The wavefront $f_3^m(r)$ in the third layer is represented by Expression (23). By setting $\Delta D = \Delta z$ in Expression (21), it is possible to calculate the wavefront $f_3^m(r)$.

$$f_3^m(r) = P_{\Delta D}\{g_2^m(r)\} \tag{23}$$

A wavefront $g_3^m(r)$ in the third layer is represented by Expression (24).

$$g_3^m(r) = T_3(r) f_3^m(r) \tag{24}$$

where, $T_3(r)$ is an amplitude transmittance in the third layer.

A wavefront $f_4^m(r)$ in the fourth layer is a wavefront when the wavefront $g_3^m(r)$ propagates by $\Delta z$. The wavefront $f_4^m(r)$ in the fourth layer is represented by Expression (25). By setting $\Delta D = \Delta z$ in Expression (21), it is possible to calculate the wavefront $f_4^m(r)$.

$$f_4^m(r) = P_{\Delta D}\{g_3^m(r)\} \tag{25}$$

A wavefront $g_4^m(r)$ in the fourth layer is represented by Expression (26).

$$g_4^m(r) = T_4(r) f_4^m(r) \tag{26}$$

where, $T_4(r)$ is an amplitude transmittance in the fourth layer.

The position of the fourth layer agrees with the position of a surface 30a of the estimation sample 30. The wavefront $g_{out}^m(r)$ emanates from the surface 30a. Thus, the wavefront $g_4^m(r)$ represents the wavefront $g_{out}^m(r)$. In FIG. 15, the wavefront $g_{out}^m(r)$ is illustrated instead of the wavefront $g_4^m(r)$.

As described above, when the estimation sample is a thick sample, it is possible to calculate the wavefront $g_{out}^m(r)$ by replacing the sample by a plurality of thin layers and finding the wavefront propagating between two layers.

At step S251, the value of the variable z is initialized. Step S261, step S262, and step S263 described later are performed for all the acquisition positions. The variable z represents the number of times these steps are performed.

Step S260 includes step S261, step S262, step S263, step S264, and step S265.

At step S261, a wavefront $u_z^m(r)$ at the acquisition position of the captured image is calculated. The wavefront $u_z^m(r)$ is represented by Expression (27).

$$u_z^m = P_{\Delta D}\{g_{out}^m(r)\} \tag{27}$$

where $\Delta D$ is a distance from the surface of the estimation sample to the thin layer.

$P_{\Delta D}\{\ \}$ is represented by Expression (28).

$$P_{\Delta D}\{\ \} = F_{2D}^{-1}[2\pi i(\Delta D)\sqrt{1/\lambda^2 - |u|^2}]F_{2D} \tag{28}$$

At step S262, a wavefront $u_{imgz}^m(r)$ at the imaging plane is calculated. The wavefront $u_{imgz}^m(r)$ is represented by Expression (29).

$$u_{imgz}^m(r) = F_{2D}^{-1}[F_{2D}\{u_z^m(r)\} \times P(u)] \tag{29}$$

At step S263, the wavefront $u_{imgz}^m(r)$ is squared. The wavefront $u_{imgz}^m(r)$ represents amplitude of light. Thus, light intensity is calculated by squaring the wavefront $u_{imgz}^m(r)$.

$|u_{imgz}^m(r)|^2$ represents a light intensity distribution at the imaging plane IP. Supposing that a first intensity distribution is a light intensity distribution at the imaging position of the imaging optical system, $|u_{imgz}^m(r)|^2$ represents the first intensity distribution at the imaging position of the imaging optical system.

At step S264, it is judged whether the value of the variable z agrees with the number of acquisition positions $N_{IM}$. If the judgement result is NO, step S265 is performed. If the judgement result is YES, step S252 is performed.

(If the Judgement Result is NO: $z \neq N_{IM}$)

If the judgement result is NO, at step S265, 1 is added to the value of the variable z. When step S265 is finished, the process returns to step S261.

At step S265, the value of the variable z has increased by one. Therefore, for another acquisition position, step S261, step S262, and step S263 are performed.

Step S261, step S262, and step S263 are repeatedly performed until an initial value is set for all the acquisition positions.

The process at step S250 will be described using the first layer and the fourth layer. The second layer and the third layer are considered in the same manner as the first layer.

Figure 16A:
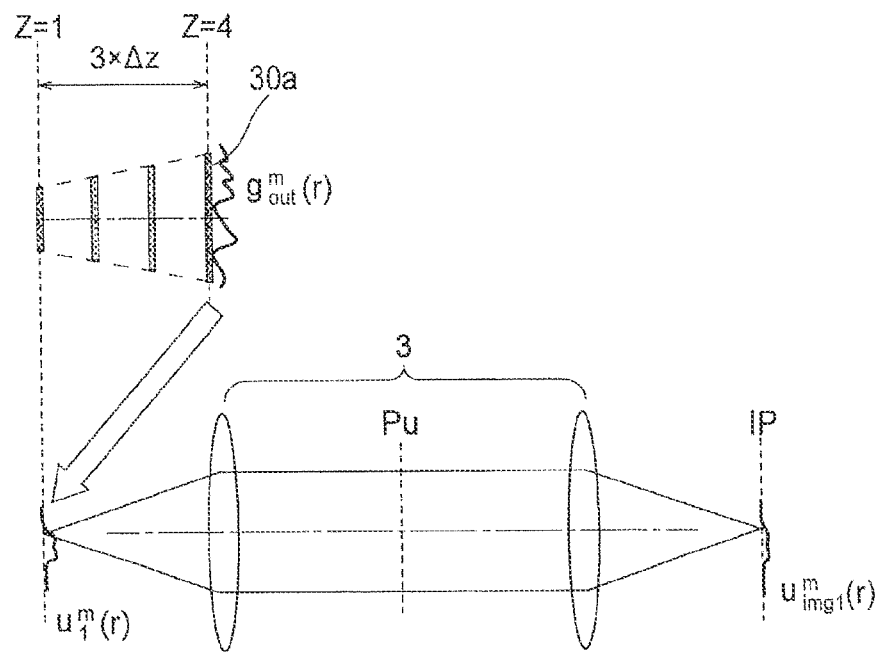
FIG. 16A and FIG. 16B are diagrams illustrating a wavefront at the acquisition position of a captured image and a wavefront at an imaging plane.
Figure 16B:
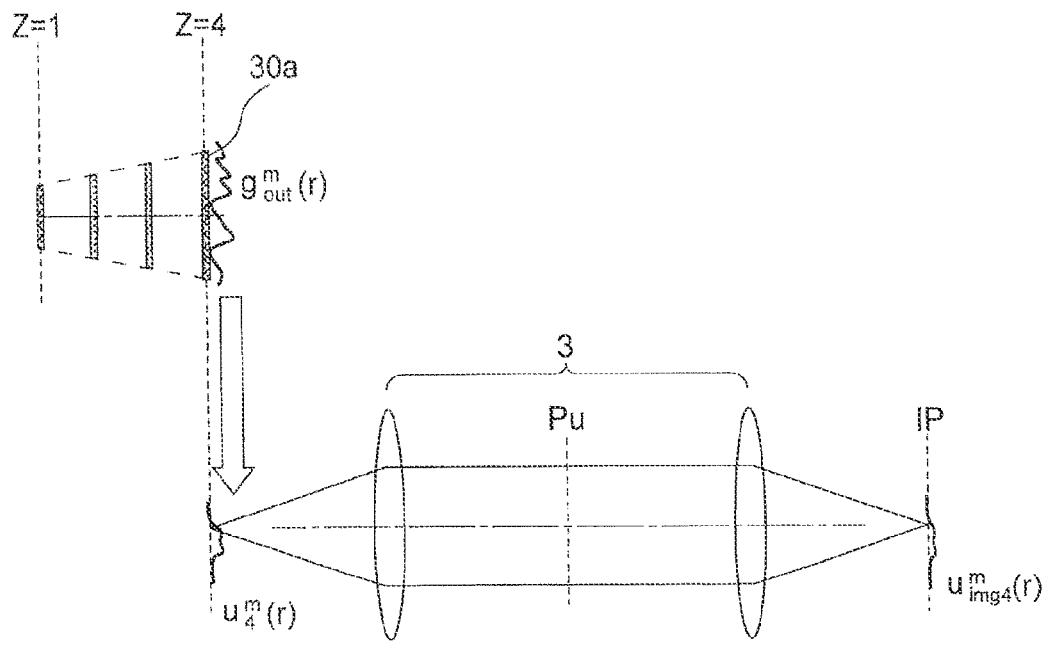

FIG. 16A and FIG. 16B are diagrams illustrating a wavefront at the acquisition position of the captured image and a wavefront at the imaging plane. FIG. 16A is a diagram illustrating two wavefronts in the first layer. FIG. 16B is a diagram illustrating two wavefronts in the fourth layer.

A captured image at z=1 is the captured image $I_{mea1}(r)$. The captured image $I_{mea1}(r)$ is an image at a position where the distance from the surface 21a is $3 \times \Delta z$. The first layer is at a distance from the surface 30a by $3 \times \Delta z$. Thus, the position of the first layer corresponds to the acquisition position of the captured image $I_{mea1}(r)$.

An emission position of the wavefront $g_{out}^m(r)$ agrees with the surface 30a. As illustrated in FIG. 16A, the emission position of the wavefront $g_{out}^m(r)$ is different from the position of the first layer. The first layer is at a distance from the emission position of the wavefront $g_{out}^m(r)$ by $3 \times \Delta z$.

A wavefront $u_1^m(r)$ in the first layer is a wavefront when the wavefront $g_{out}^m(r)$ propagates by $3 \times \Delta z$ in a direction opposite to the traveling direction of light. Thus, by setting $\Delta D = -3 \times \Delta z$ at step S261, it is possible to calculate the wavefront $u_1^m(r)$ from Expression (27) and Expression (28).

When the wavefront $u_1^m(r)$ is calculated, at step S262, a wavefront $u_{img1}^m(r)$ at the imaging plane is calculated from Expression (29).

Further, at step S263, light intensity $|u_{img1}(r)|^2$ of the image in the first layer is calculated.

A captured image at z=2 is the captured image $I_{mea2}(r)$. The captured image $I_{mea2}(r)$ is an image at a position where the distance from the surface 21a is $2 \times \Delta z$. The second layer is at a distance from the surface 30a by $2 \times \Delta z$. Thus, the position of the second layer corresponds to the acquisition position of the captured image $I_{mea2}(r)$.

The emission position of the wavefront $g_{out}^m(r)$ is different from the position of the second layer. The second layer is at a distance from the emission position of the wavefront $g_{out}^m(r)$ by $2 \times \Delta z$.

A wavefront $u_2^m(r)$ in the second layer is a wavefront when the wavefront $g_{out}^m(r)$ propagates by $2 \times \Delta z$ in a direction opposite to the traveling direction of light. Thus, by setting $\Delta D = -2 \times \Delta z$ at step S261, it is possible to calculate the wavefront $u_2^m(r)$.

When the wavefront $u_2^m(r)$ is calculated, at step S262, a wavefront $u_{img2}^m(r)$ at the imaging plane is calculated.

Further, at step S263, light intensity $|u_{img2}(r)|^2$ of the image in the second layer is calculated.

A captured image at z=3 is the captured image $I_{mea3}(r)$. The captured image $I_{mea3}(r)$ is an image at a position where the distance from the surface 21a is $\Delta z$. The third layer is at a distance from the surface 30a by $\Delta z$. Thus, the position of the third layer corresponds to the acquisition position of the captured image $I_{mea3}(r)$.

The emission position of the wavefront $g_{out}^m(r)$ is different from the position of the third layer. The third layer is at a distance from the emission position of the wavefront $g_{out}^m(r)$ by $\Delta z$.

A wavefront $u_3^m(r)$ in the third layer is a wavefront when the wavefront $g_{out}^m(r)$ propagates by $\Delta z$ in a direction opposite to the traveling direction of light. Thus, by setting $\Delta D = -\Delta z$ at step S261, it is possible to calculate the wavefront $u_3^m(r)$.

When the wavefront $u_3^m(r)$ is calculated, at step S262, a wavefront $u_{img3}^m(r)$ at the imaging plane is calculated.

Further, at step S263, light intensity $|u_{img3}(r)|^2$ of the image in the third layer is calculated.

A captured image at z=4 is the captured image $I_{mea4}(r)$. The captured image $I_{mea4}(r)$ is an image at the surface 21a. The fourth layer agrees with the surface 30a. Thus, the position of the fourth layer corresponds to the acquisition position of the captured image $I_{mea4}(r)$.

The emission position of the wavefront $g_{out}^m(r)$ is the surface 30a. As illustrated in FIG. 16B, the emission position of the wavefront $g_{out}^m(r)$ is the same as the position of the fourth layer.

A wavefront $u_4^m(r)$ in the fourth layer is the same as the wavefront $g_{out}^m(r)$. It is possible to replace the wavefront $g_{out}^m(r)$ by the wavefront $u_4^m(r)$.

When the wavefront $u_4^m(r)$ is calculated, at step S262, a wavefront $u_{img4}^m(r)$ at the imaging plane is calculated.

Further, at step S263, light intensity $|u_{img4}(r)|^2$ of the image in the fourth layer is calculated.

The wavefront $u_z^m(r)$ and the wavefront $u_{imgz}^m(r)$ represent the wavefront generated by illumination light emitted from the m-th light source, that is, illumination light emitted from one light source.

The image $I_{estz}(r)$ of the estimation sample is generated at the acquisition position by illumination light emitted from all the light sources. Thus, it is necessary to find the wavefront for all the light sources.

(If the Judgement Result is YES: $z = N_{IM}$)

Step S242 is performed.

The wavefront $f_{in}^m(r)$, the wavefront $g_{out}^m(r)$, the wavefront $u_z^m(r)$, and the wavefront $u_{imgz}^m(r)$ represent the wavefronts generated by illumination light emitted from the m-th light source, that is, illumination light emitted from one light source.

The image $I_{estz}(r)$ of the estimation sample is generated by illumination light emitted from all the light sources. Thus, it is necessary to find the wavefront $f_{in}^m(r)$, the wavefront $g_{out}^m(r)$, the wavefront $u_z^m(r)$, and the wavefront $u_{imgz}^m(r)$ for all the light sources.

At step S252, it is judged whether the value of the variable m agrees with the number of light sources $N_{LS}$. If the judgement result is NO, step S253 is performed. If the judgement result is YES, step S270 is performed.

(If the Judgement Result is NO: $m \neq N_{LS}$)

If the judgement result is NO, at step S253, 1 is added to the value of the variable m. When step S253 is finished, the process returns to step S41.

At step S253, the value of the variable m has increased by one. Therefore, for another light source, the wavefront $f_{in}^m(r)$ is calculated at step S41, the wavefront $g_{out}^m(r)$ is calculated at step S42, the wavefront $u_z^m(r)$ is calculated at step S261, the wavefront $u_{imgz}^m(r)$ is calculated at step S262, and $|u_{imgz}^m(r)|^2$ is calculated at step S263.

Step S41, step S42, step S251, and step S260 are repeatedly performed until $|u_{imgz}{}^m(r)|^2$ is found for all the light sources.

(If the Judgement Result is YES: $m=N_{LS}$)

If the judgement result is YES, at step S270, $|u_{imgz}{}^m(r)|^2$ are summed. As a result, the image $I_{estz}(r)$ of the estimation sample is calculated. The image $I_{estz}(r)$ of the estimation sample is represented by Expression (30).

$$I_{estz}(r) = \sum_m |u_{imgz}^m(r)|^2 \tag{30}$$

Figure 17A:
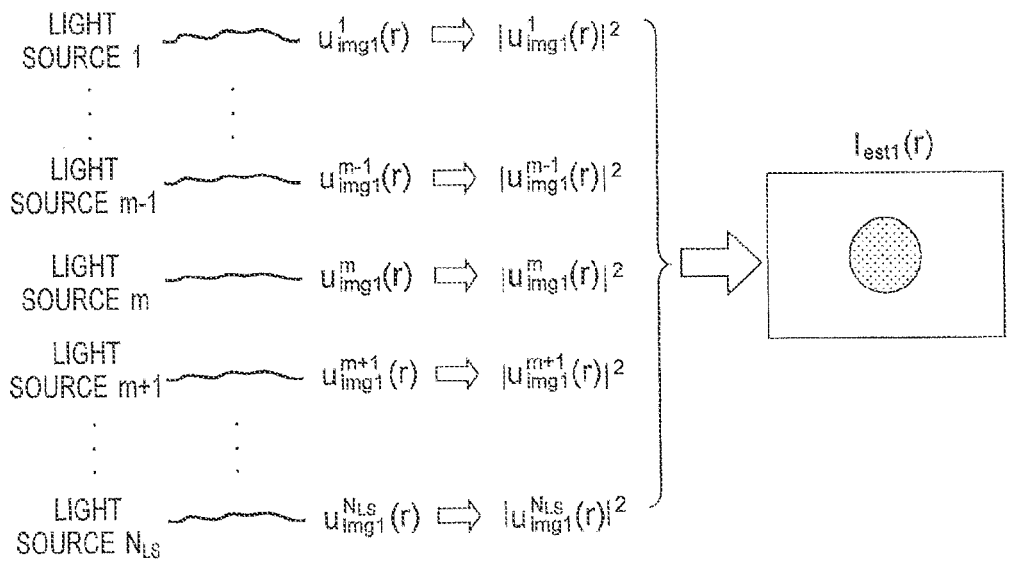
FIG. 17A and FIG. 17B are diagrams illustrating an image of an estimation sample.
Figure 17B:
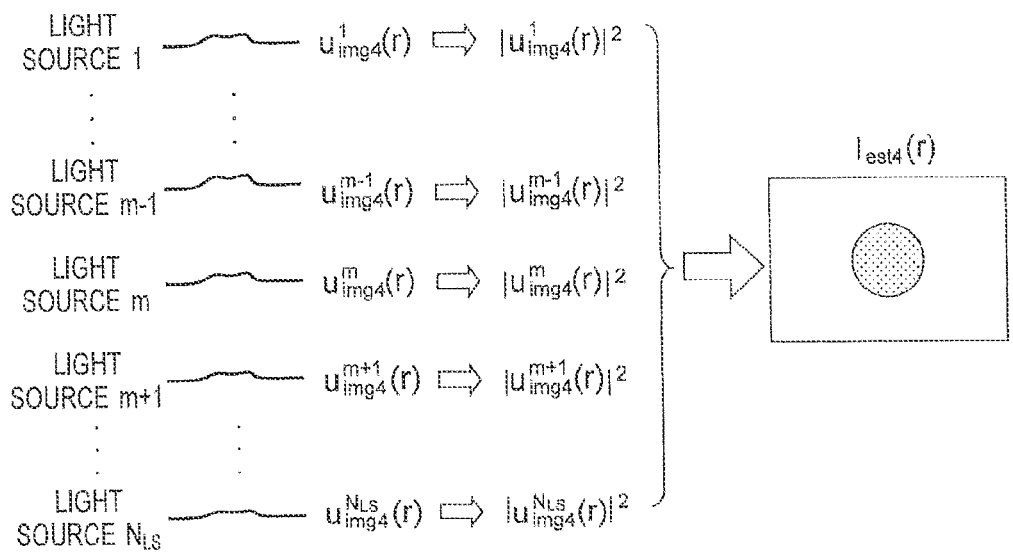

FIG. 17A and FIG. 17B are diagrams illustrating an image of the estimation sample. FIG. 17A is a diagram illustrating the image of the estimation sample in the first layer. FIG. 17B is a diagram illustrating the image of the estimation sample in the fourth layer.

An image $I_{est1}(r)$ of the estimation sample is an image in a case where the wavefront $u_{img1}{}^m(r)$ is found for all the light sources. An image $I_{est4}(r)$ of the estimation sample is an image in a case where the wavefront $u_{img4}{}^m(r)$ is found for all the light sources.

As illustrated in FIG. 17A, the wavefront $u_{img1}{}^m(r)$ is calculated for each light source, $|u_{img1}{}^m(r)|^2$ is calculated from the wavefront $u_{img1}{}^m(r)$, and $|u_{img1}{}^m(r)|^2$ are summed. As a result, the image $I_{est1}(r)$ of the estimation sample in the first layer is calculated.

As illustrated in FIG. 17B, the wavefront $u_{img4}{}^m(r)$ is calculated for each light source, $|u_{img4}{}^m(r)|^2$ is calculated from the wavefront $u_{img4}{}^m(r)$, and $|u_{img4}{}^m(r)|^2$ are summed. As a result, the image $I_{est4}(r)$ of the estimation sample in the fourth layer is calculated.

(If the Judgement Result is YES: $m=N_{LS}$)

At step S280, the residual is calculated. The residual is represented by Expression (31). As indicated by Expression (31), the residual is calculated from a captured image $I_{meaz}(r)$ and the image $I_{estz}(r)$ of the estimation sample.

$$\sum_m |I_{meaz}(r) - I_{estz}(r)|_{12}^2 \tag{31}$$

As described above, the number of captured images is four, and the number of images of the estimation sample is also four. Thus, the residual in the first layer is calculated from $I_{mea1}(r)$ and $I_{est1}(r)$. The residual in the second layer is calculated from $I_{mea2}(r)$ and $I_{est2}(r)$. The residual in the third layer is calculated from $I_{mea3}(r)$ and $I_{est3}(r)$. The residual in the fourth layer is calculated from $I_{mea4}(r)$ and $I_{est4}(r)$.

The residual to be used at step S70 is calculated from the residual in the first layer, the residual in the second layer, the residual in the third layer, and the residual in the fourth layer.

At step S70, the residual is compared with a threshold value. If the judgement result is NO, step S290 is performed. If the judgement result is YES, step S110 is performed.

(If the Judgement Result is NO: Residual≥Threshold Value)

At step S290, the value of a variable L is initialized. Step S301, step S302, step S303, step S304, and step S310 described later are performed the number of times set at step S210. The variable L represents the number of times these steps are performed.

Step S300 includes step S301, step S302, step S303, step S304, step S305, step S306, and step S310.

At step S301, one is selected at random from among 1 to $N_{IM}$. At step S311 described later, the wavefront after correction is calculated. In calculation of the wavefront after correction, one captured image and one image of the estimation sample are used.

As described above, at step S270, a plurality of images of the estimation sample are calculated. An image of the estimation sample to be used in calculation of the wavefront after correction is one. Thus, the image of the estimation sample to be used in calculation of the wavefront after correction is selected from among a plurality of images of the estimation sample.

$N_{IM}$ is the number of layers. When $N_{IM}=4$, at step S301, one numeral is selected at random from among numerals from 1 to 4.

For example, when the selected numeral is 1, the numeral 1 represents the first layer. The captured image at the first acquisition position corresponds to the image of the estimation sample in the first layer. Thus, in calculation of the wavefront after correction, the captured image at the first acquisition position and the image of the estimation sample in the first layer are used.

Furthermore, for example, when the selected numeral is 4, the selected numeral represents the fourth layer. The captured image at the fourth acquisition position corresponds to the image of the estimation sample in the fourth layer. Thus, in calculation of the wavefront after correction, the captured image at the fourth acquisition position and the image of the estimation sample in the fourth layer are used.

At step S302, the value selected at step S301 is input to a variable zL. As described above, at step S301, one numeral is selected at random from among numerals from 1 to $N_{IM}$. For example, when the selected numeral is 1, at step S302, 1 is input to the variable zL.

At step S303, the value of the variable m is initialized. Step S311, step S312, and step S313 described later are performed for all the light sources. The variable m represents the number of times these steps are performed.

Step S310 is the step of optimizing a refractive index distribution of the estimation sample.

Step S310 includes step S311, step S312, step S313, step S314, and step S315.

At step S311, a wavefront $u'_{zL}{}^m(r)$ is calculated. The wavefront $u'_{zL}{}^m(r)$ is a wavefront at a position of the layer indicated by the value of the variable zL.

In calculation of the wavefront $u'_{zL}{}^m(r)$, a captured image $I_{meazL}(r)$ and an image $I_{estzL}(r)$ of the estimation sample are used. The captured image $I_{meazL}(r)$ is a captured image at the position indicated by the value of the variable zL among captured images $I_{meaz}$. The image $I_{estzL}(r)$ of the estimation sample is an image of the estimation sample at the position indicated by the value of the variable zL, among images $I_{estz}$ of the estimation sample.

The wavefront $u'_{zL}{}^m(r)$ is represented by Expression (32).

$$u'^m_{zL}(r) = u^m_{zL}(r) \frac{I_{meazL}(r)}{I_{estzL}(r)} \tag{32}$$

FIG. 18A, FIG. 18B, FIG. 18C, and FIG. 18D are diagrams illustrating correction of wavefronts. FIG. 18A is a diagram illustrating a wavefront before correction emanating from the estimation sample. FIG. 18B is a diagram illustrating a wavefront before correction at the acquisition position of the captured image. FIG. 18C is a diagram illustrating a wavefront after correction at the acquisition position of the captured image. FIG. 18D is a diagram illustrating a wavefront after correction emanating from the estimation sample.

A case where the numeral selected at step S301 is 1, that is, zL=1 will be described.

As illustrated in FIG. 17A, the image $I_{est1}(r)$ of the estimation sample is calculated based on the wavefront $u_{img1}{}^m(r)$. Furthermore, as illustrated in FIG. 17A and FIG. 18B, the wavefront $u_{img1}{}^m(r)$ is calculated based on the wavefront $u_1{}^m(r)$.

As illustrated in FIG. 18A, the amplitude transmittance $T_z(r)$ is used in calculation of the wavefront $u_1{}^m(r)$. The amplitude transmittance $T_z(r)$ is an estimated amplitude transmittance. When step S300 is performed the first time, this amplitude transmittance $T_z(r)$ is different from an amplitude transmittance of the sample 21.

As the difference between the amplitude transmittance $T_z(r)$ and the amplitude transmittance of the sample 21 increases, the difference between the image $I_{estz}(r)$ of the estimation sample and the captured image $I_{meaz}(r)$ also increases. Thus, it is possible to consider the difference between the image $I_{estz}(r)$ of the estimation sample and the captured image $I_{meaz}(r)$ to reflect the difference between the amplitude transmittance $T_z(r)$ and the amplitude transmittance of the sample 21.

As described above, zL=1. Then, letting zL=1 in Expression (32), the wavefront $u_1{}^m(r)$ is corrected using the image $I_{est1}(r)$ of the estimation sample and the captured image $I_{mea1}(r)$. As a result, as illustrated in FIG. 18C, a corrected wavefront, that is, a wavefront $u'_1{}^m(r)$ is obtained.

By using the wavefront $u'_1{}^m(r)$, it is possible to calculate a new amplitude transmittance. The wavefront $u'_1{}^m(r)$ is different from the wavefront $u_1{}^m(r)$. Thus, the new amplitude transmittance is different from the amplitude transmittance when the wavefront $u_1{}^m(r)$ is calculated.

At step S312, a wavefront $g'_{out}{}^{m,zL}(r)$ after correction is calculated. The wavefront $g'_{out}{}^{m,zL}(r)$ is a wavefront when the wavefront $u'_{zL}{}^m(r)$ propagates by ΔD. The wavefront $g'_{out}{}^{m,zL}(r)$ is represented by Expression (33).

$$g_{out}{}^{m,zL}(r) = P_{\Delta D}\{u_{zL}{}^m(r)\} \quad (33)$$

As described above, it is possible to calculate the amplitude transmittance $T_z(r)$ using the wavefront $u'_1{}^m(r)$. However, as illustrated in FIG. 18A, a wavefront at the position of the wavefront $g_{out}{}^m(r)$ is necessary for calculation of the amplitude transmittance $T_z(r)$.

As illustrated in FIG. 18A and FIG. 18C, the position of the wavefront $u'_1{}^m(r)$ is different from the position of the wavefront $g_{out}{}^m(r)$. Thus, in order to calculate the amplitude transmittance $T_z(r)$, as illustrated in FIG. 18D, a wavefront $g'_{out}{}^{m,1}(r)$ is necessary.

The wavefront $g'_{out}{}^{m,1}(r)$ is a wavefront when the wavefront $u'_1{}^m(r)$ propagates by 3×Δz. By setting ΔD=3×Δz and zL=1 in Expression (33), it is possible to calculate the wavefront $g'_{out}{}^{m,1}(r)$.

At step S313, a gradient $\Delta T_z{}^{m,zL}(r)$ of the sample is calculated. $\Delta T_z{}^{m,zL}(r)$ is a gradient of the sample when the sample is illuminated by the m-th light source and correction is made with the captured image at the position of the layer indicated by the value of the variable zL and the image of the estimation sample.

The gradient $\Delta T_z{}^{m,zL}$ of the sample is represented by Expression (34). For example, it is possible to use the gradient descent method for calculation of the gradient $\Delta T_z{}^{m,zL}(r)$ of the sample.

$$\Delta T_z^{m,zL}(r) = \frac{|f_z^m(r)| f_{in}^{*m}(r)(g_z^{'m,zL}(r) - g_z^m(r))}{T_z(r)_{max}(|T_z(r)|^2 + \delta)} \quad (34)$$

where
f* is the complex conjugate of f, and
δ is the normalizing constant for preventing division by zero.

As described above, the estimation sample 30 is replaced by a plurality of thin layers. Thus, for each of the thin layers, it is necessary to calculate the gradient $\Delta T_z{}^{m,zL}(r)$ of the sample.

Figure 19A:
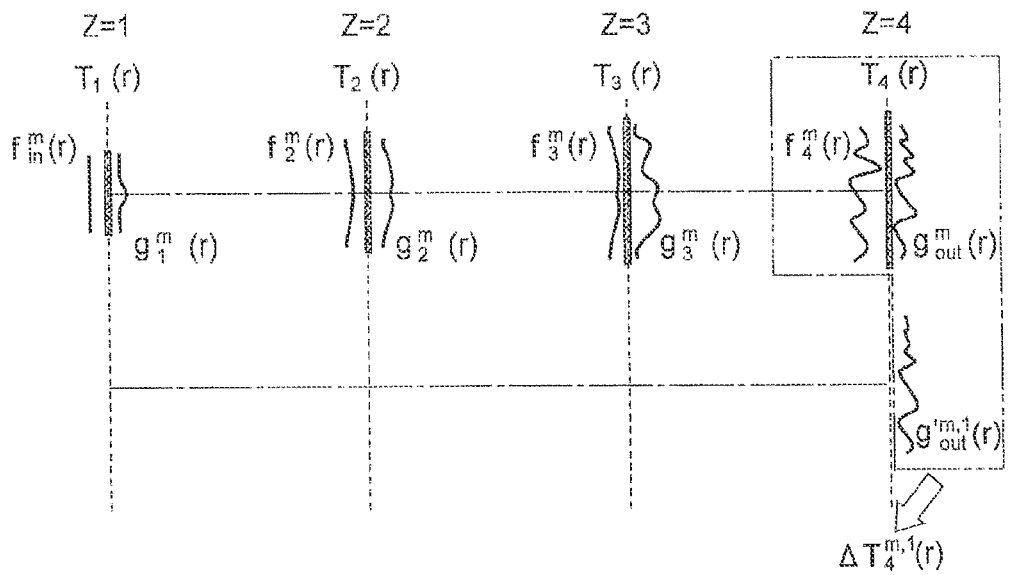
FIG. 19A and FIG. 19B are diagrams illustrating a gradient of a sample and propagation of wavefronts.
Figure 19B:
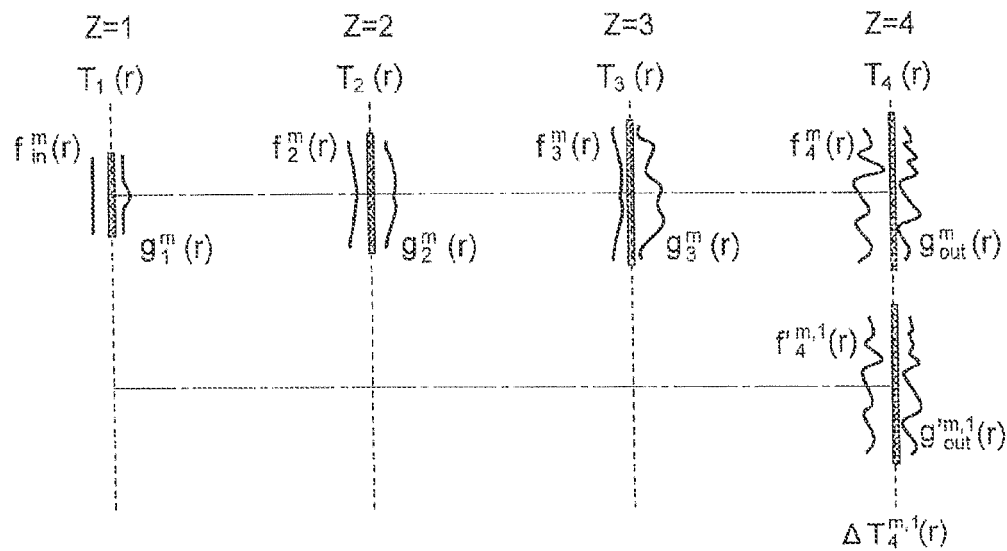

FIG. 19A and FIG. 19B are diagrams illustrating a gradient of a sample and propagation of wavefronts. A case where the estimation sample 30 is replaced by four thin layers, that is, $N_{IM}=4$ will be described. Furthermore, zL=1 is set. FIG. 19A is a diagram illustrating the gradient of a sample. FIG. 19B is a diagram illustrating propagation of wavefronts.

An amplitude transmittance $T_4(r)$ is used in calculation of the wavefront $g_{out}{}^m(r)$. The amplitude transmittance $T_4(r)$ is the estimated amplitude transmittance. Thus, this amplitude transmittance $T_4(r)$ is different from the amplitude transmittance of the sample 21.

As the difference between the amplitude transmittance $T_4(r)$ and the amplitude transmittance of the sample 21 increases, the difference between the wavefront $g_{out}{}^m(r)$ and the wavefront $g'_{out}{}^{m,1}(r)$ also increases. Thus, it is possible to consider the difference between the wavefront $g_{out}{}^m(r)$ and the wavefront $g'_{out}{}^{m,1}(r)$ to reflect the difference between the amplitude transmittance $T_4(r)$ and the amplitude transmittance of the sample 21.

The wavefront $f_4{}^m(r)$, the amplitude transmittance $T_4(r)$, the wavefront $g_{out}{}^m(r)$, and the wavefront $g'_{out}{}^{m,1}(r)$ are known. Then, by setting z=4 and zL=1 in Expression (34), as illustrated in FIG. 19A, it is possible to calculate a gradient $\Delta T_4{}^{m,1}(r)$ of the sample.

Since the wavefront $g_4{}^m(r)$ and the wavefront $g_{out}{}^m(r)$ are the same, the wavefront $g_{out}{}^m(r)$ can be used instead of the wavefront $g_4{}^m(r)$. Furthermore, since the wavefront $g'_4{}^{m,1}(r)$ is the same as the wavefront $g'_{out}{}^{m,1}(r)$, the wavefront $g'_{out}{}^{m,1}(r)$ can be used instead of the wavefront $g'_4{}^{m,1}(r)$.

Subsequently, a gradient $\Delta T_3{}^{m,1}(r)$ of the sample is calculated. The wavefront at the position of the wavefront $g_3{}^m(r)$ is necessary for calculation of the gradient $\Delta T_3{}^{m,1}(r)$ of the sample. In order to calculate this wavefront, as illustrated in FIG. 19B, a wavefront $f'_4{}^{m,1}(r)$ is necessary.

It is possible to calculate the wavefront $f'_4{}^{m,1}(r)$ by setting z=4 and zL=1 in Expression (35).

$$f_z^{'m,zL}(r) = f_z^m(r) + \frac{|T_z(r)| T_z^*(r)(g_z^{'m,zL}(r) - g_z^m(r))}{|f_z^m(r)|_{max}(|f_z^m(r)|^2 + \delta)} \quad (35)$$

Subsequently, the wavefront at the position of a wavefront $g_3{}^{m,1}(r)$ is calculated using the calculated wavefront $f'_4{}^{m,1}(r)$.

Figure 20A:
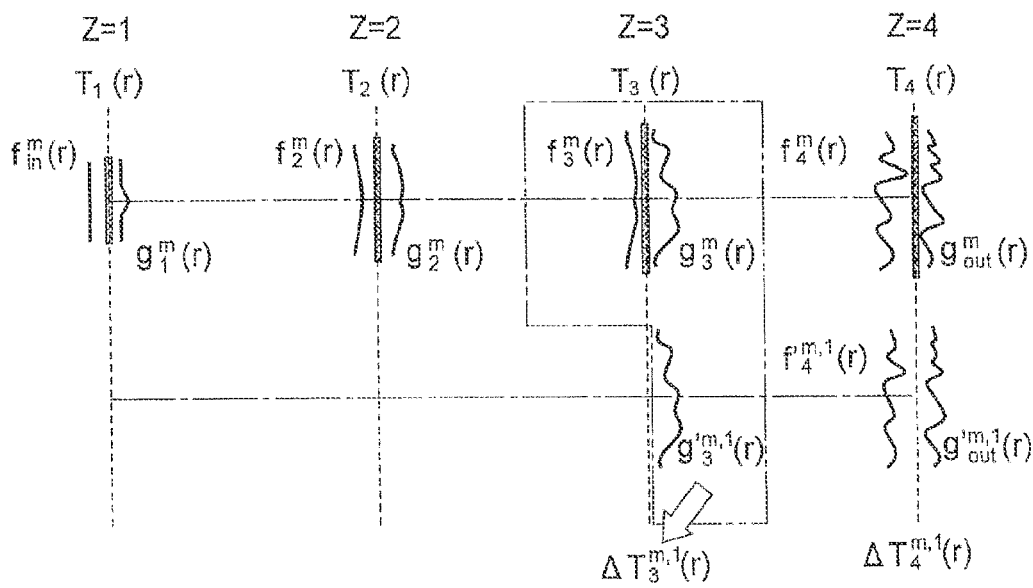
FIG. 20A and FIG. 20B are diagrams illustrating a gradient of a sample and propagation of wavefronts.
Figure 20B:
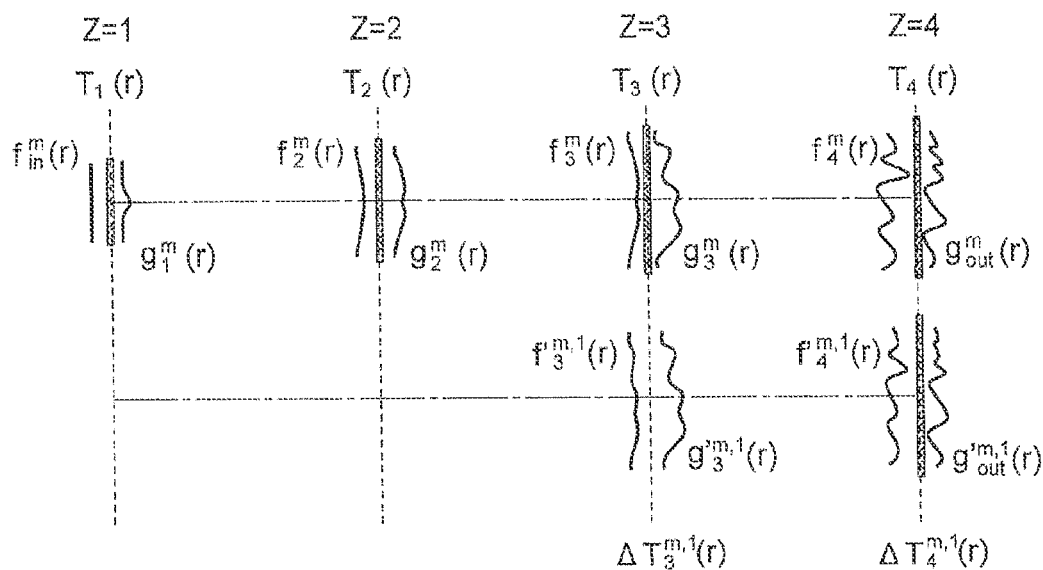

FIG. 20A and FIG. 20B are diagrams illustrating a gradient of a sample and propagation of wavefronts. FIG. 20A is a diagram illustrating propagation of wavefronts and the gradient of the sample. FIG. 20B is a diagram illustrating propagation of wavefronts.

As illustrated in FIG. 20A, a wavefront $g'_3{}^{m,1}(r)$ is a wavefront when the wavefront $f'_4{}^{m,1}(r)$ propagates by Δz. This is propagation of a wavefront from the fourth layer to the third layer.

As described above, the propagation of a wavefront from the third layer to the fourth layer is represented by Expression (25). Thus, by setting the items as follows in Expression (25), it is possible to calculate the wavefront $g'_3{}^{m,1}(r)$.

The wavefront $f_4{}^m(r)$ is replaced by the wavefront $g'_3{}^{m,1}(r)$.

The wavefront $g_3{}^m(r)$ is replaced by the wavefront $f'_4{}^{m,1}(r)$.

$\Delta D = -\Delta z$ is set.

The wavefront $f_3{}^m(r)$, the amplitude transmittance $T_3(r)$, the wavefront $g_3{}^m(r)$, and the wavefront $g'_3{}^{m,1}(r)$ are known. Then, by setting z=3 and zL=1 in Expression (34), as illustrated in FIG. 20B, it is possible to calculate the gradient $\Delta T_3{}^{m,1}(r)$ of the sample.

It is possible to calculate the wavefront $f'_3{}^{m,1}(r)$ by setting z=3 and zL=1 in Expression (35).

The gradient of the sample is also calculated for the second layer and the first layer, in the same manner as for the third layer.

Figure 21:
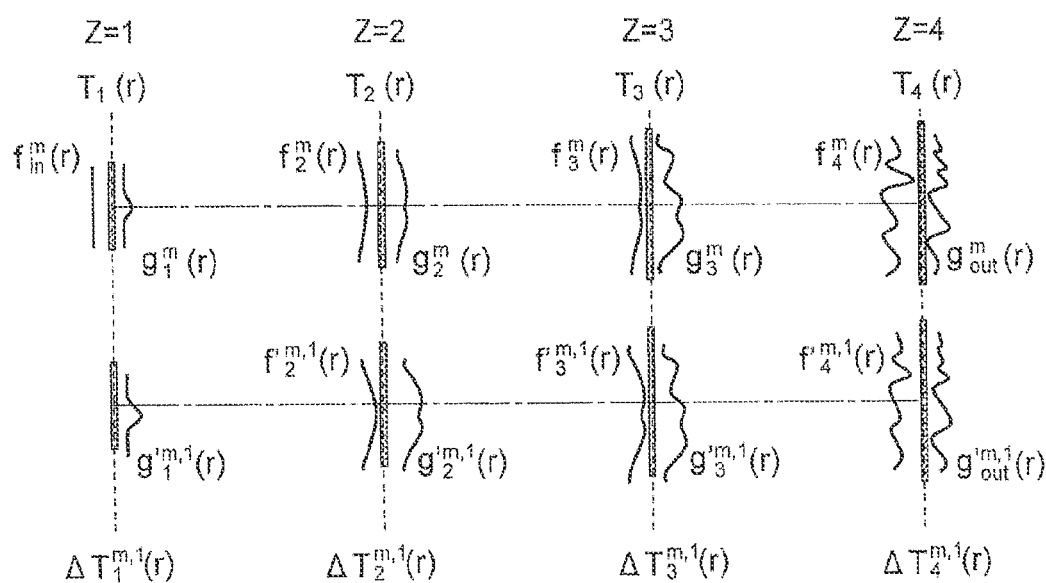
FIG. 21 is a diagram illustrating a gradient of a sample.

FIG. 21 is a diagram illustrating a gradient of a sample. In FIG. 21, a gradient $\Delta T_1{}^{m,1}(r)$ of the sample in the first layer, a gradient $\Delta T_2{}^{m,1}(r)$ of the sample in the second layer, the gradient $\Delta T_3{}^{m,1}(r)$ of the sample in the third layer, and the gradient $\Delta T_4{}^{m,1}(r)$ of the sample in the fourth layer are calculated.

A gradient $\Delta T_z{}^{m,1}(r)$ of the sample obtained at step S313 is a gradient of the sample when the sample is illuminated by the m-th light source and correction is made with the captured image at the position of the first layer and the image of the estimation sample at the position of the first layer. The gradient $\Delta T_z{}^{m,1}(r)$ of the sample is judged by illumination light emitted from all the light sources. Thus, it is necessary to find the gradient $\Delta T_z{}^{m,1}(r)$ of the sample for all the light sources.

At step S314, it is judged whether the value of the variable m agrees with the number of light sources $N_{LS}$. If the judgement result is NO, step S315 is performed. If the judgement result is YES, step S304 is performed.

(If the Judgement Result is NO: m≠$N_{LS}$)

If the judgement result is NO, at step S315, 1 is added to the value of the variable m. When step S315 is finished, the process returns to step S311.

At step S315, the value of the variable m has increased by one. Therefore, for another light source, a wavefront $u'_{zL}{}^m(r)$ is calculated at step S311, the wavefront $g_{out}{}'^{m,1}(r)$ is calculated at step S312, and the gradient $\Delta T_z{}^{m,1}(r)$ of the sample is calculated at step S313.

Step S311, step S312, and step S313 are repeatedly performed until the gradient $\Delta T_z{}^{m,1}(r)$ of the sample is found for all the light sources.

FIG. 22 is a diagram illustrating a gradient of a sample. In FIG. 22, the gradient $\Delta T_z{}^{m,1}(r)$ of the sample is found for all the light sources.

(If the Judgement Result is YES: m=$N_{LS}$)

If the judgement result is YES, at step S304, the amplitude transmittance $T_z(r)$ is updated. Step S304 is the step of updating the estimation sample.

The updated amplitude transmittance $T_z(r)$ is represented by Expression (36).

$$T_z(r) = T_z(r) + \alpha \sum_m \Delta T_z^{m,zL}(r) \quad (36)$$

where
α is the correction coefficient for the gradient of the sample.

At step S305, it is judged whether the value of the variable L agrees with the number of times of correction $N_{CR}$. If the judgement result is NO, step S306 is performed. If the judgement result is YES, step S30 is performed.

(If the Judgement Result is NO: L≠$N_{CR}$)

If the judgement result is NO, at step S306, 1 is added to the value of the variable L. When step S306 is finished, the process returns to step S301.

At step S301, one is selected at random from among 1 to $N_{IM}$. The image of the estimation sample to be used in correction and the acquisition position are judged based on the selected numeral.

Then, the wavefront $u'_{zL}{}^m(r)$ is calculated at step S311, the wavefront $g_{out}{}'^{m,1}(r)$ is calculated at step S312, the gradient $\Delta T_z{}^{m,1}(r)$ of the sample is calculated at step S313, and the amplitude transmittance $T_z(r)$ is updated at step S304.

Step S301, step S302, step S303, step S304, and step S310 are repeatedly performed until correction of a set number of times is finished.

(If the Judgement Result is YES: L=$N_{CR}$)

If the judgement result is YES, the process returns to step S30. Step S30 to step S300 are performed with the updated amplitude transmittance $T_z(r)$.

Step S30 to step S300 are repeatedly performed whereby the updated amplitude transmittance $T_s(r)$ gradually approaches the amplitude transmittance of the sample 21. In other words, the residual becomes smaller. Eventually, the residual becomes smaller than the threshold value.

(If the Judgement Result is YES: Residual<Threshold Value)

At step S110, the refractive index distribution of the estimation sample is calculated. The obtained amplitude transmittance $T_z(r)$ is identical or substantially identical with the amplitude transmittance of the sample 21. A refractive index distribution $n_z(r)$ is found from the obtained amplitude transmittance $T_z(r)$ and Expression (1).

It is possible to reconstruct the structure of the estimation sample by using the refractive index distribution $n_z(r)$ obtained at step S110. It is possible to output the reconstructed structure of the estimation sample to, for example, a display device. The estimation sample 30 is a thick sample. In the second simulation, for the structure of a thick sample, it is possible to reconstruct the structure of a thick sample, in other words, a three-dimensional configuration of the estimation sample.

As described above, the amplitude transmittance $T_z(r)$ obtained at step S110 is identical or substantially identical with the amplitude transmittance of the sample 21. In this case, it is also possible to consider the refractive index distribution $n_z(r)$ to be identical or substantially identical with the refractive index distribution of the sample 21. Thus, it is possible to consider the reconstructed structure of the estimation sample 30 to be identical or substantially identical with the structure of the sample 6.

In the second simulation, step S250, step S270, and step S310 are repeatedly performed. As a result, the amplitude transmittance $T_z(r)$ is updated. As described above, step S250 and step S270 are the step of calculating an image of the estimation sample. Step S310 is the step of optimizing a refractive index distribution of the estimation sample.

The amplitude transmittance $T_z(r)$ represents the estimation sample. Thus, the step of calculating an image of the estimation sample and the step of optimizing a refractive index distribution of the estimation sample are repeatedly performed whereby the estimation sample is updated.

It is preferable that the refractive index distribution estimating system of the present embodiment further include a light source, the illumination optical system include a condenser lens and a first aperture member, the imaging optical system include an objective lens and an tube lens, and an image of the first aperture member be formed at a pupil position of the objective lens.

Figure 23:
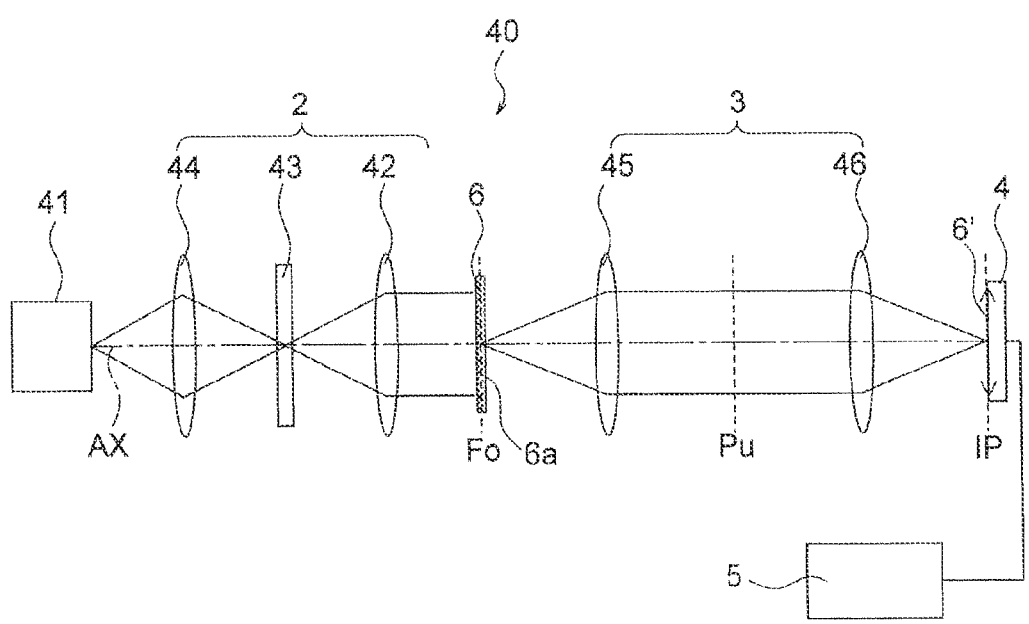
FIG. 23 is a diagram illustrating a refractive index distribution estimating system of the present embodiment.

FIG. 23 is a diagram illustrating the refractive index distribution estimating system of the present embodiment. The same configuration as that in FIG. 1A is denoted by the same numeral and a description thereof is omitted.

A refractive index distribution estimating system 40 includes a light source 41. The illumination optical system 2 includes a condenser lens 42, a first aperture member 43, and a lens 44. The imaging optical system 3 includes an objective lens 45 and an tube lens 46.

Light emitted from the light source 41 is collected by the lens 44. The first aperture member 43 is disposed at a light collecting position. The first aperture member 43 is disposed at a front focus position of the condenser lens 42. Thus, a parallel light flux emanates from the condenser lens 42 toward the sample 6.

The sample 6 is disposed at a front focus position of the objective lens 45. Light incident on the objective lens 45 from the sample 6 emanates from the objective lens 45 in the form of a parallel light flux. The parallel light flux emanating from the objective lens 45 is collected by the tube lens 46.

The front focus position of the objective lens 45 coincides with a rear focus position of the condenser lens 42. Thus, an image of the first aperture member 43 is formed at the pupil position Pu of the objective lens 45. For example, it is possible to use a microscope optical system for the illumination optical system 2 and the imaging optical system 3.

In the refractive index distribution estimating system of the present embodiment, it is preferable that the first aperture member have an annular transmission part or darkening part.

Figure 24A:
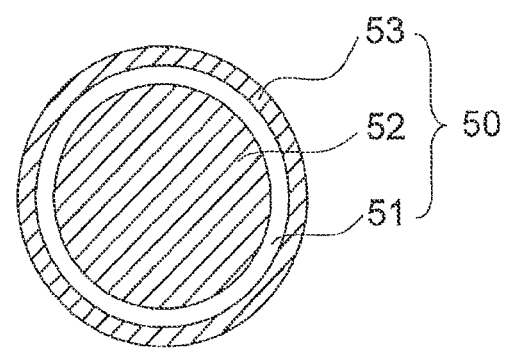
FIG. 24A and FIG. 24B are diagrams illustrating a first aperture member.
Figure 24B:
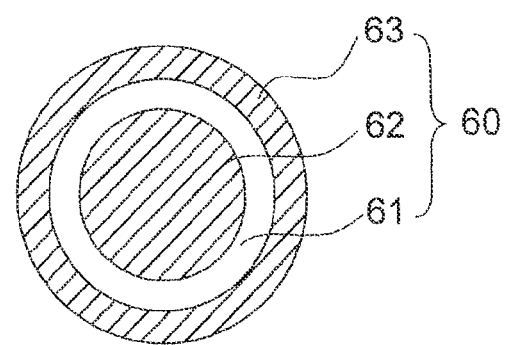

FIG. 24A and FIG. 24B are diagrams illustrating the first aperture member. FIG. 24A is a diagram illustrating a first example. FIG. 24B is a diagram illustrating a second example.

In the first example, a first aperture member 50 has an annular transmission part 51, a circular light-shielding part 52, and an annular light-shielding part 53. The transmission part 51 may be a darkening part.

In the second example, a second aperture member 60 has an annular transmission part 61, a circular light-shielding part 62, and an annular light-shielding part 63. The transmission part 61 may be a darkening part.

In the first aperture member 50 and the second aperture member 60, position of the transmission part and width of the transmission part are different. The transmission part 51 is positioned outside, compared with the transmission part 61. The width of the transmission part 51 is smaller than the width of the transmission part 61.

It is preferable that the refractive index distribution estimating system of the present embodiment include a second aperture member different from the first aperture member and a moving mechanism configured to switch the first aperture member and the second aperture member.

Figure 25:
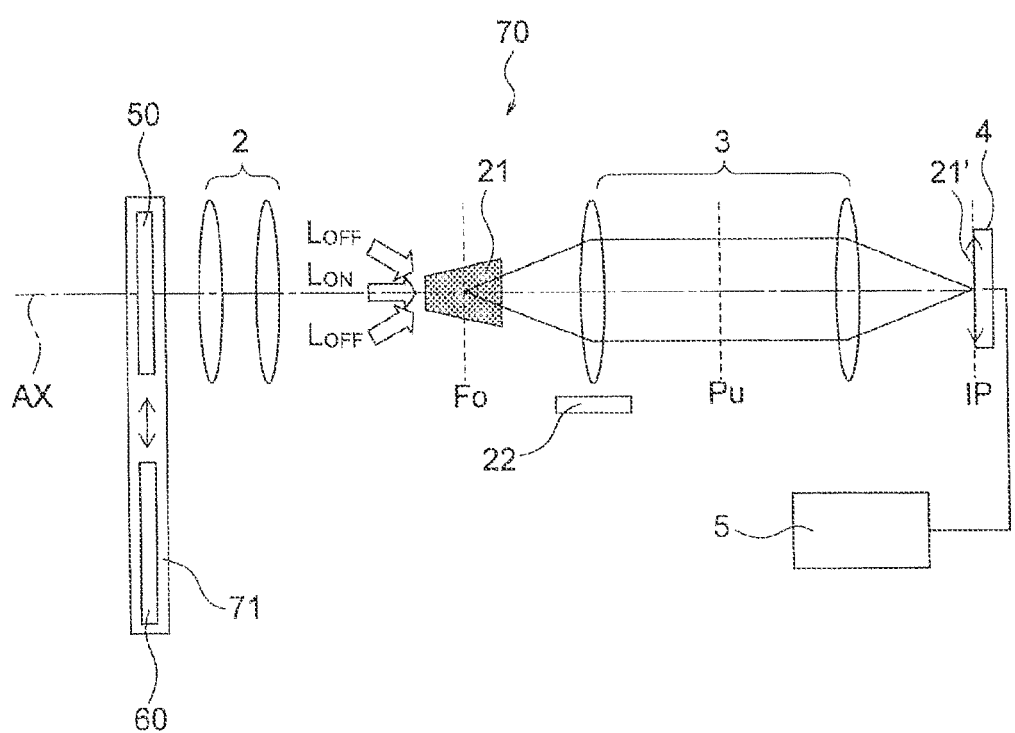
FIG. 25 is a diagram illustrating a refractive index distribution estimating system of the present embodiment.

FIG. 25 is a diagram illustrating the refractive index distribution estimating system of the present embodiment. The same configuration as that in FIG. 9A is denoted by the same numeral and a description thereof is omitted.

A refractive index distribution estimating system 70 includes a plurality of aperture members. For example, it is possible to use the first aperture member 50 and the second aperture member 60. It is possible to dispose the first aperture member 50 and the second aperture member 60 in a moving mechanism 71.

For example, it is possible to use a slider as the moving mechanism 71. In this case, by moving the slider, it is possible to position one of the first aperture member 50 and the second aperture member 60 on the optical axis AX.

For example, it is possible to use a turret as the moving mechanism 71. In this case, by turning the turret, it is possible to position one of the first aperture member 50 and the second aperture member 60 on the optical axis AX.

Figure 26:
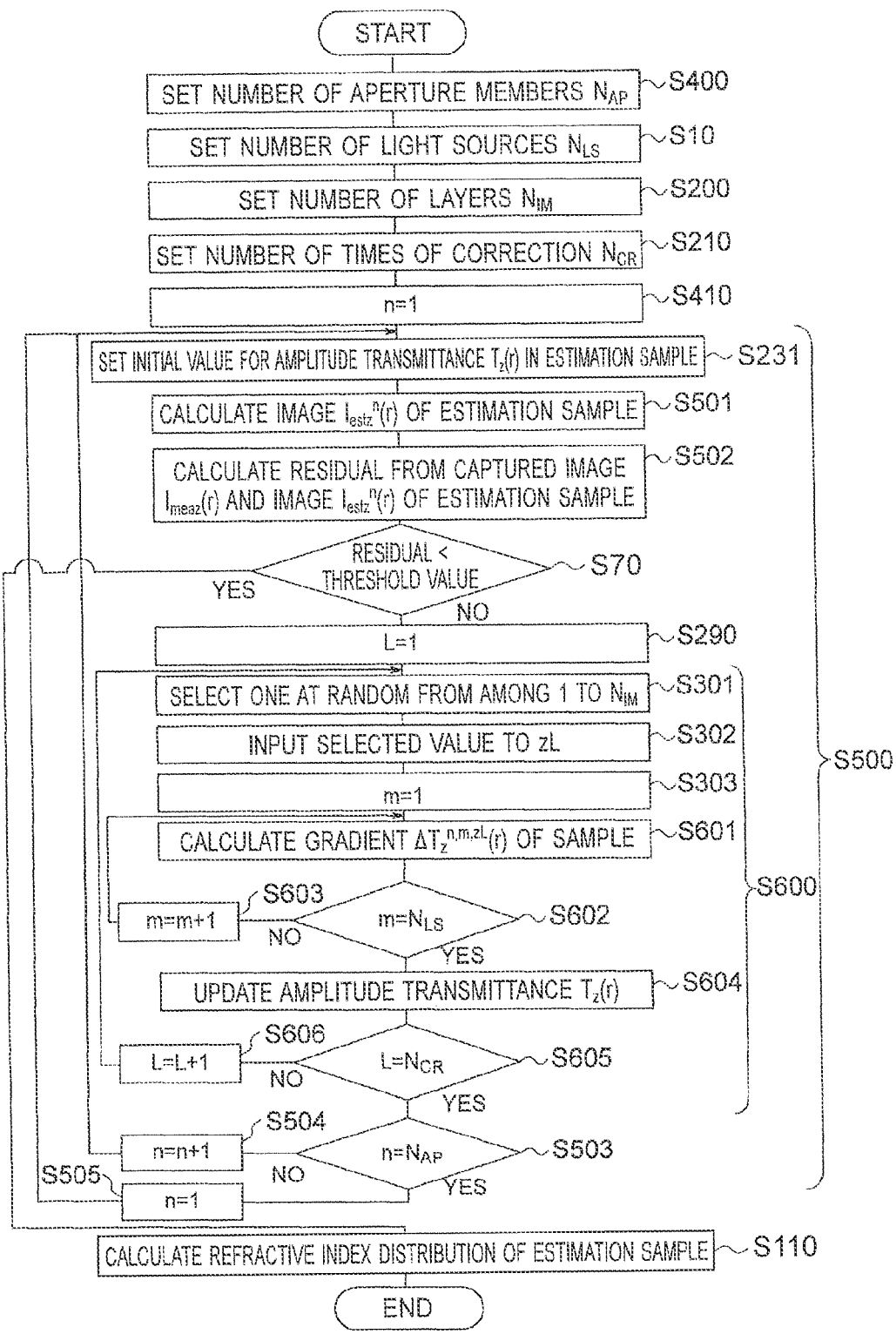
FIG. 26 is a flowchart of a third simulation.

FIG. 26 is a flowchart of the third simulation. The same process as the process in the second flowchart is denoted by the same numeral and a description thereof is omitted.

At step S400, the number of aperture members $N_{AP}$ is set. As described above, a plurality of aperture members are used in the refractive index distribution estimating system 70.

At step S410, the value of a variable n is initialized. Step S231, step S501, step S502, step S70, step S290, and step S600 described later are performed for at least one aperture member. The variable n represents the number of times these steps are performed.

Step S500 includes step S231, step S501, step S502, step S70, step S290, step S503, step S504, step S505, and step S600.

At step S231, an initial value is set for the amplitude transmittance $T_z(r)$ in the estimation sample 30. The amplitude transmittance $T_z(r)$ is the amplitude transmittance in the z-th layer.

In FIG. 26, only step S231 is illustrated. However, a specific process for calculating the amplitude transmittance $T_z(r)$ is the same as the process of calculating the amplitude transmittance $T_z(r)$ in the second simulation. Thus, the number of amplitude transmittances $T_z(r)$ is the same as the number of layers.

At step S501, an image $I_{estz}^n(r)$ of the estimation sample is calculated. The image $I_{estz}^n(r)$ of the estimation sample is a image of the estimation sample in the z-th layer when the n-th aperture member is used.

In FIG. 26, only step S501 is illustrated. However, a specific process of calculating the image $I_{estz}^n(r)$ of the estimation sample is the same as the process of calculating the image $I_{estz}(r)$ of the estimation sample in the second simulation. Thus, the number of images $I_{estz}^n(r)$ of the estimation sample is the same as the number of layers.

In calculation of the image $I_{estz}^n(r)$ of the estimation sample, the following Expression (37) to Expression (44) are used.

$$f_1^{n,m}(r) = \exp(2\pi i_{u_m} \cdot r) \tag{37}$$

$$u_{n,m} = (\sin\theta_{x,n,m}, \sin\theta_{y,n,m}) \tag{38}$$

$$g_z^{n,m}(r) = T_z(r) f_z^{n,m}(r), z=1,2,\ldots,N_{IM} \tag{39}$$

$$f_{z+1}^{n,m}(r) = P_{\Delta D}\{g_{z+1}^{n,m}(r)\}, z=1,2,\ldots,N_{IM} \tag{40}$$

where,
$\Delta D$ is the distance between adjacent two layers.

$$g_{out}^{n,m}(r) = g_{N_{IM}}^{n,m}(r) \tag{41}$$

$$u_z^{n,m}(r) = P_{\Delta D}\{g_{out}^{n,m}(r)\} \tag{42}$$

where,
$\Delta D$ is a distance from the surface of the estimation sample to the acquisition position of the captured image.

$$u_{imgz}^{n,m}(r) = F_{2D}^{-1}[F_{2D}\{u_z^{n,m}(r)\} \times P(u)] \tag{43}$$

$$I_{estz}^n(r) = \sum_m |u_{imgz}^{n,m}(r)|^2 \tag{44}$$

At step S70, the residual is compared with a threshold value. If the judgement result is NO, step S290 is performed. If the judgement result is YES, step S110 is performed.

(If the Judgement Result is NO: Residual≥Threshold Value)

At step S290, the value of the variable L is initialized, and thereafter step S600 is performed.

At step S601, a gradient $\Delta T_z^{n,m,zL}(r)$ of the sample is calculated. The gradient $\Delta T_z^{n,m,zL}(r)$ of the sample is the gradient of the sample in the z-th layer when the n-th aperture member is used.

In the gradient $\Delta T_z^{n,m,zL}(r)$ of the sample, the sample is illuminated by the m-th light source. Furthermore, correction is performed using the captured image at the zL-th acquisition position and the image of the estimation sample in the zL-th layer.

In calculation of the gradient $\Delta T_z^{n,m,zL}(r)$ of the sample, the following Expression (45) to Expression (49) are used.

$$u'^{n,m}_{zL}(r) = u^{n,m}_{zL}(r) \frac{I^n_{meazL}(r)}{I^n_{estzL}(r)} \tag{45}$$

$$g'^{n,m,zL}_{out}(r) = P_{\Delta D}\{u'^{n,m}_{zL}(r)\} \tag{46}$$

where,

ΔD is a distance from the zL-th layer to the surface of the estimation sample.

$$\Delta T_z^{n,m,zL}(r) = \frac{|f_z^{n,m}(r)|f_z^{*n,m}(r)\left(g_z'^{n,m,zL}(r) - g_z^{n,m}(r)\right)}{|T_z(r)|_{max}\left(|T_z(r)|^2 + \delta\right)} \tag{47}$$

$$f_z'^{n,m,zL}(r) = f_z^{n,m}(r) + \frac{|T_z(r)|T_z^*(r)\left(g_z'^{n,m,zL}(r) - g_z^{n,m}(r)\right)}{|f_z^{n,m}(r)|_{max}\left(|f_z^{n,m}(r)|^2 + \delta\right)} \tag{48}$$

$$g'^{n,m,zL}_{z-1}(r) = P_{\Delta D}\{f_z'^{n,m,zL}(r)\} \tag{49}$$

The gradient $\Delta T_z^{n,m,zL}(r)$ of the sample obtained at step S601 is a gradient of the sample when the n-th aperture member is used, the sample is illuminated by the m-th light source, and correction is made with the captured image at the zL-th position and the image of the estimation sample at the zL-th position. The gradient $\Delta T_z^{n,m,zL}(r)$ of the sample is judged by illumination light emitted from all the light sources. Thus, it is necessary to find the gradient $\Delta T_z^{n,m,zL}(r)$ of the sample for all the light sources.

At step S602, it is judged whether the value of the variable m agrees with the number of light sources $N_{LS}$. If the judgement result is NO, step S603 is performed. If the judgement result is YES, step S604 is performed.

(If the Judgement Result is NO: m≠$N_{LS}$)

If the judgement result is NO, at step S603, 1 is added to the value of the variable m. When step S603 is finished, the process returns to step S601.

At step S603, the value of the variable m has increased by one. Therefore, for another light source, the gradient $T_z^{n,m,zL}(r)$ of the sample is calculated at step S601.

(If the Judgement Result is YES: m=$N_{LS}$)

If the judgement result is YES, at step S604, the amplitude transmittance $T_z(r)$ is updated. Step S604 is the step of updating the estimation sample.

The updated amplitude transmittance $T_z(r)$ is represented by Expression (50).

$$T_z(r) = T_z(r) + \alpha \sum_m \Delta T_z^{n,m,zL}(r) \tag{50}$$

where

α is the correction coefficient for the gradient of the sample.

At step S605, it is judged whether the value of the variable L agrees with the number of times of correction $N_{CR}$. If the judgement result is NO, step S606 is performed. If the judgement result is YES, step S503 is performed.

(If the Judgement Result is NO: L≠$N_{CR}$)

If the judgement result is NO, at step S606, 1 is added to the value of the variable L. When step S606 is finished, the process returns to step S301.

(If the Judgement Result is YES: L=$N_{CR}$)

If the judgement result is YES, step S503 is performed.

At step S503, it is judged whether the value of the variable n agrees with the number of aperture members $N_{AP}$. If the judgement result is NO, step S504 is performed. If the judgement result is YES, step S505 is performed.

(If the Judgement Result is NO: n≠$N_{AP}$)

If the judgement result is NO, at step S504, 1 is added to the value of the variable n. When step S504 is finished, the process returns to step S231.

At step S504, the value of the variable n has increased by one. Therefore, for another aperture member, step S500 is performed.

(If the Judgement Result is YES: n=$N_{AP}$)

If the judgement result is YES, at step S505, 1 is set for the value of the variable n. When step S505 is finished, the process returns to step S231.

Even when step S500 is performed for all the aperture members, the residual may be greater than the threshold value in some cases. In such a case, step S500 is performed using the initial aperture member, for example the first aperture member, again.

(If the Judgement Result is YES: Residual<Threshold Value)

At step S110, the refractive index distribution of the estimation sample is calculated. The obtained amplitude transmittance $T_z(r)$ is identical or substantially identical with the amplitude transmittance of the sample 21. The refractive index distribution $n_z(r)$ is found from the obtained amplitude transmittance $T_z(r)$ and Expression (15).

FIG. 27A, FIG. 27B, and FIG. 27C are diagrams illustrating an aperture member and a captured image. FIG. 27A is a diagram illustrating a first aperture member and a captured image. FIG. 27B is a diagram illustrating a second aperture member and a captured image. FIG. 27C is a diagram illustrating a third aperture member and a captured image.

The first aperture member, the second aperture member, and the third aperture member each have an annular transmission part. A position of the transmission part and a width of the transmission part vary among the aperture members.

The captured image is an image of the optical image on the XZ plane. The X direction is a direction orthogonal to the optical axis. The Z direction is an optical axis direction.

In the simulation described above, an initial value is set for the amplitude transmittance $T_z(r)$ in the estimation sample. As described in the second simulation, it is possible to use the transport of intensity equation for the setting of an initial value.

Figure 28A:
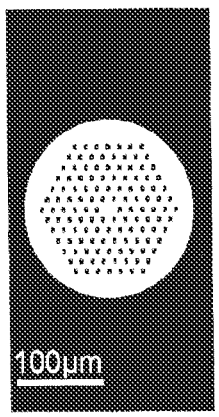
FIG. 28A, FIG. 28B, and FIG. 28C are diagrams illustrating a sample, a captured image, and an image of an initial value.
Figure 28B:
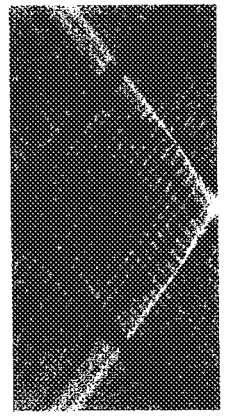
Figure 28C:
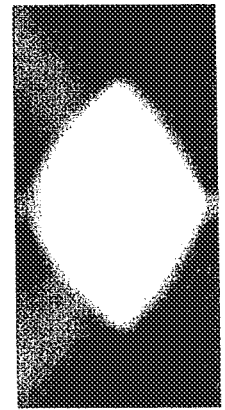

FIG. 28A, FIG. 28B, and FIG. 28C are diagrams illustrating a sample, a captured image, and an image of an initial value. FIG. 28A is a diagram illustrating a sample. FIG. 28B is a diagram illustrating a captured image. FIG. 28C is a diagram illustrating an image of an initial value.

The sample is a photonic crystal fiber (hereinafter referred to as "PCF"). The captured image is an image of the optical image on the XZ plane. The image representing the initial value is an image based on the value calculated by Expression (15).

Figure 29A:
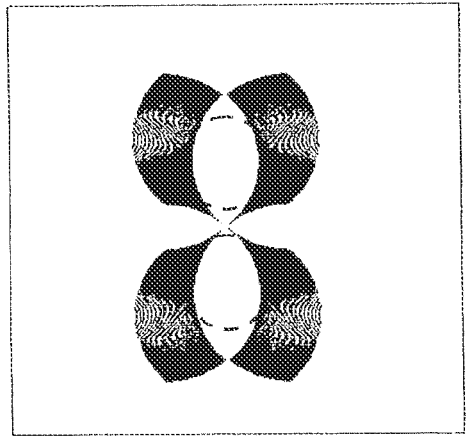
FIG. 29A and FIG. 29B are diagrams illustrating a transmittable spatial frequency band.
Figure 29B:
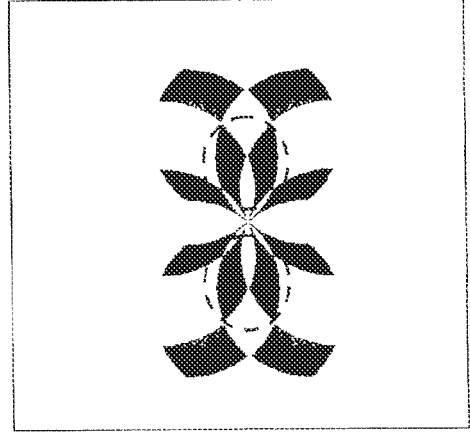

FIG. 29A and FIG. 29B are diagrams illustrating a transmittable spatial frequency band. FIG. 29A is a diagram illustrating a spatial frequency band when the shape of the transmission part is circular. FIG. 29B is a diagram illustrating a spatial frequency band when the shape of the transmission part is annular.

In the two diagrams, the horizontal axis is the Z direction, and the vertical axis is the X direction or the Y direction. The Y direction is a direction orthogonal to both of the Z direction and the X direction. Furthermore, in calculation of the spatial frequency band, an objective lens having a numerical aperture of 1.4 is used, and the numerical aperture of the illumination optical system is changed.

In order that the image of the sample is reproduced, the spatial frequency of the sample has to be transmitted to the imaging plane. Factors that determine a transmittable spatial frequency include the numerical aperture of the illumination optical system and the numerical aperture of the imaging optical system.

When the shape of the transmission part is circular, as illustrated in FIG. 29A, there is no spatial frequency band in the inside of the range indicated by broken lines. By contrast, when the shape of the transmission part is annular, as illustrated in FIG. 29B, there is a spatial frequency band in the inside of the range indicated by broken lines.

The range indicated by broken lines is a range in which the spatial frequency is low. Thus, when the shape of the transmission part is annular, it is possible to transmit a low spatial frequency to a high spatial frequency. As a result, it is possible to reproduce the image of the sample more accurately.

The transmittable spatial frequency varies with the position of the annular shape and the width of the annular shape.

Figures 30A, 30B:
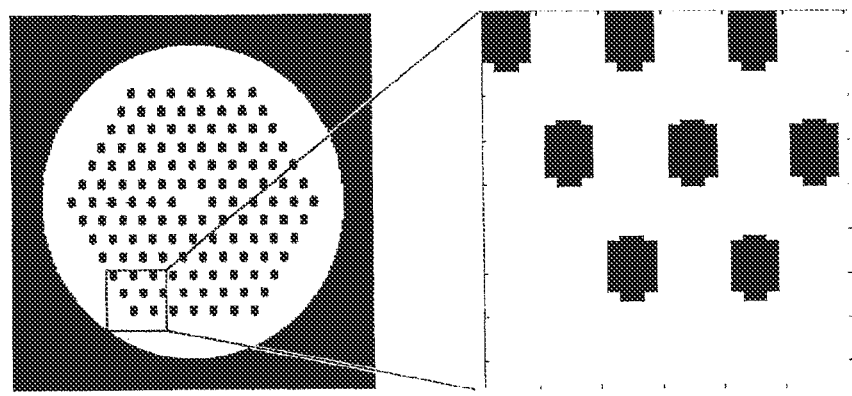
FIG. 30A and FIG. 30B are diagrams illustrating a sample.

FIG. 30A and FIG. 30B are diagrams illustrating a sample. FIG. 30A is a cross section illustrating the entire sample. FIG. 30B is a cross section illustrating a part of the sample.

The sample is a PCF. In the PCF, the diameter of the cladding is 180.0 μm, the diameter of a hole is 6.0 μm, and the distance between holes is 12.9 μm. The refractive index of the cladding is 1.456.

The PCF is immersed in a liquid. Thus, the holes are filled with the liquid. Furthermore, the outside of the PCF is also covered with the same liquid. The refractive index of the liquid is 1.436. The refractive index of the cladding is higher than the refractive index of the part other than the cladding by 0.02.

The wavelength of illumination light is 1500 nm. Furthermore, the numerical aperture of the objective lens is 1.4.

FIG. 31A, FIG. 31B, FIG. 31C, FIG. 31D, FIG. 31E, FIG. 31F, FIG. 31G, FIG. 31H, FIG. 31I, FIG. 31J, FIG. 31K, FIG. 31L, FIG. 31M, FIG. 31N, FIG. 31O, and FIG. 31P are captured images, diagrams illustrating transmittable spatial frequencies, the entire images of a reproduced image, and partial images of the reproduced image.

Figures 31A, 31B, 31C, 31D:
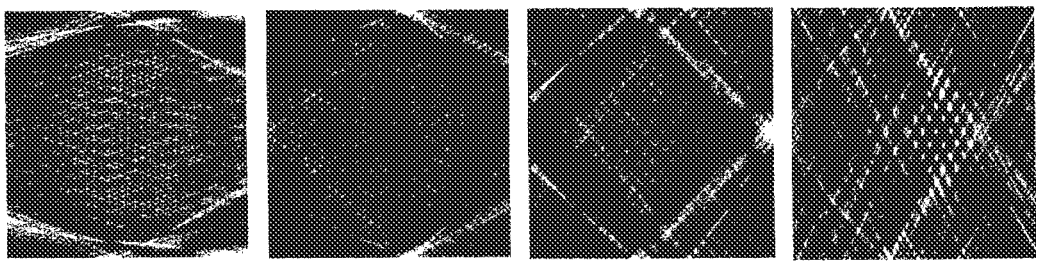
FIG. 31A, FIG. 31B, FIG. 31C, FIG. 31D, FIG. 31E, FIG. 31F, FIG. 31G, FIG. 31H, FIG. 31I, FIG. 31J, FIG. 31K, FIG. 31L, FIG. 31M, FIG. 31N, FIG. 31O, and FIG. 31P are captured images, diagrams illustrating transmittable spatial frequencies, entire images of a reproduced image, and partial images of the reproduced image.

FIG. 31A is a captured image at a first ring. FIG. 31B is a captured image at a second ring. FIG. 31C is a captured image at a third ring. FIG. 31D is a captured image at a fourth ring.

It is possible to represent the position of the ring and the width of the ring by the numerical aperture of the illumination optical system. As described above, the four rings are set as follows. The numerical value is the numerical aperture of the illumination optical system. The numerical value on the left side represents the inside of the ring. The numerical value on the right side represents the outside of the ring.

First ring: 0.14-0.54
Second ring: 0.7-0.9
Third ring: 1.0-1.1
Fourth ring: 1.15-1.25

The ring is positioned on the outer side as the numerical value of the numerical aperture of the illumination optical system is larger. Thus, the first ring is positioned on the innermost side, and the fourth ring is positioned on the outermost side.

FIG. 31A, FIG. 31B, FIG. 31C, and FIG. 31D are images of the optical image on the XZ plane.

When FIG. 31A, FIG. 31B, FIG. 31C, and FIG. 31D are compared, the image is sharper in the order of the first ring, the second ring, the third ring, and the fourth ring. In other words, the image is sharper as the ring is positioned on the outer side.

The image is shaper as the spatial frequency included in the transmittable spatial frequency band is higher. As described above, the image is sharper as the ring is positioned on the outer side. Thus, the spatial frequency included in the transmittable spatial frequency band is higher as the ring is positioned on the outer side.

As just described, there is a correlation between the position of the ring and the transmittable spatial frequency. Then, by combining a plurality of rings, it is possible to change the spatial frequency included in the transmittable spatial frequency band.

FIG. 31E, FIG. 31F, FIG. 31G, and FIG. 31H illustrate a transmittable spatial frequency. The number of the rings and the combination of rings are as follows.

Figures 31E, 31F, 31G, 31H:
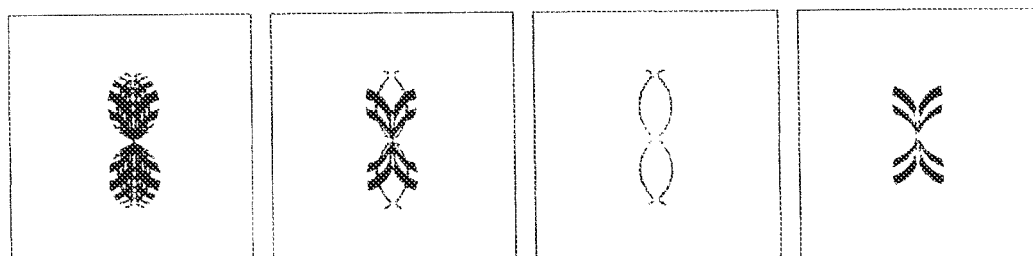

FIG. 31E: first ring, second ring, third ring, fourth ring.
FIG. 31F: first ring, fourth ring.
FIG. 31G: fourth ring.
FIG. 31H: first ring.

When FIG. 31E, FIG. 31F, FIG. 31G, and FIG. 31H are compared, the spatial frequency included in the transmittable spatial frequencies is higher as the ring is positioned on the outer side. Furthermore, the more rings are combined, the more spatial frequencies are included in the transmittable spatial frequencies.

In reproduction of the image of the sample, a captured image is used. In order to reproduce the image of the sample more accurately, it is desirable that the captured image include a low spatial frequency to a high spatial frequency.

FIG. 31I, FIG. 31J, FIG. 31K, FIG. 31L, FIG. 31M, FIG. 31N, FIG. 31O, and FIG. 31P illustrate reproduced images. The number and the combination of rings are as follows.

Figures 31I, 31J, 31K, 31L:
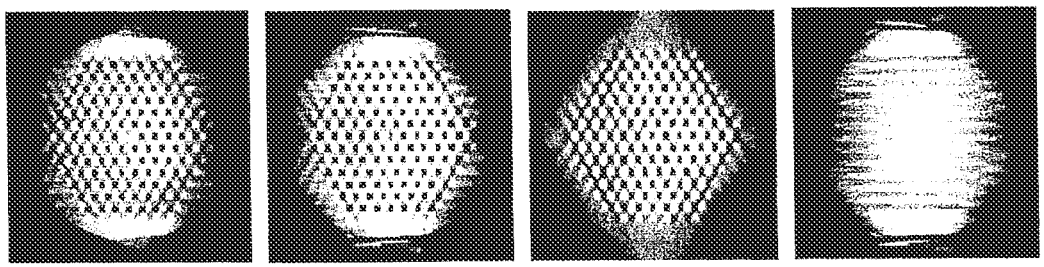
Figures 31M, 31N, 31O, 31P:
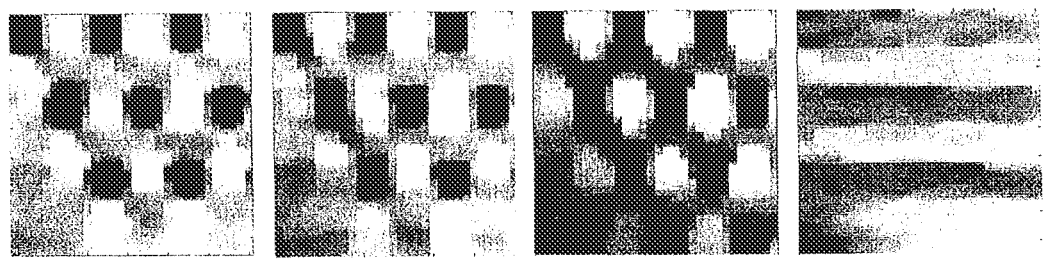

FIG. 31I, FIG. 31M: first ring, second ring, third ring, fourth ring.
FIG. 31J, FIG. 31N: first ring, fourth ring.
FIG. 31K, FIG. 31O: fourth ring.
FIG. 31L, FIG. 31P: first ring.

When FIG. 31I, FIG. 31J, FIG. 31K, and FIG. 31L are compared, the reproduced image is sharper as the ring is positioned on the outer side. Furthermore, the more rings are combined, the shaper the reproduced image is.

When four rings are used, there are fewer artifacts on the outside of the PCF than when two rings are used. Therefore, as can be understood from FIG. 31M and FIG. 31N, the reproduced image is closer to the actual shape of holes when four rings are used.

The hole in which a diameter is smaller than the outer diameter of the PCF has a higher spatial frequency than the outer shape (contour) of the PCF. Thus, when the fourth ring is used, it is possible to reproduce a portion with a high spatial frequency sharply in the reproduced image. Therefore, as illustrated in FIG. 31K and FIG. 31O, the reconstruction of the holes is successful.

However, when the fourth ring is used, information is missing for a portion with a low spatial frequency in the reproduced image. Therefore, as illustrated in FIG. 31K, the outer shape of the PCF is elongated up and down.

Furthermore, when the first ring is used, as illustrated in FIG. 31L, the outer shape of the PCF is roughly reproduced. However, when the first ring is used, information is missing for a portion with a high spatial frequency in the reproduced image. Therefore, as illustrated in FIG. 31P, reconstruction of the holes is failed.

As just described, by combining a plurality of rings, it is possible to expand the spatial frequency band that can be used for reconstruction of the image. As a result, it is possible to improve the performance in reconstruction of the image.

Figure 32A:
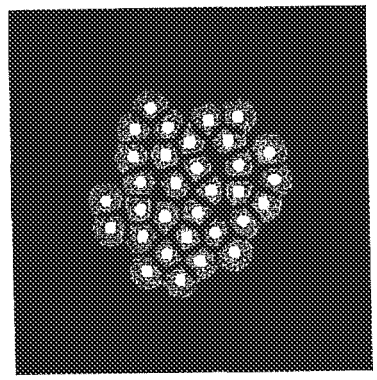
FIG. 32A, FIG. 32B, FIG. 32C, and FIG. 32D are diagrams illustrating a sample and an image of the reproduced image.
Figure 32C:
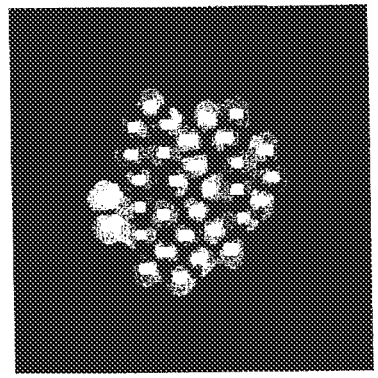
Figure 32B:
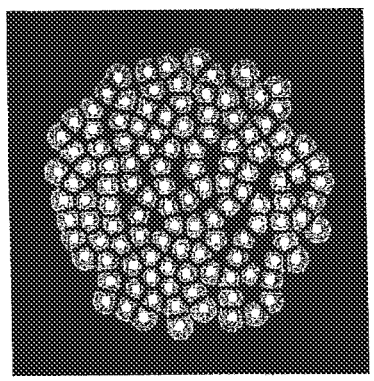
Figure 32D:
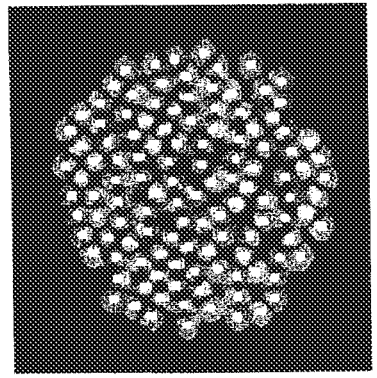

FIG. 32A, FIG. 32B, FIG. 32C, and FIG. 32D are diagrams illustrating a sample and images of the reproduced image. FIG. 32A is a diagram illustrating a first sample. FIG. 32B is a diagram illustrating a second sample. FIG. 32C is an image of the reproduced image of the first sample. FIG. 32D is an image of the reproduced image of the second sample.

The first sample is 50 μm of aggregate cells. The second sample is 100 μm of aggregate cells. The wavelength of illumination light is 1.5 μm. The size of one cell is 10 μm. The size of the cell nucleus is 3 μm. The refractive index of the cytoplasm is 1.36. The refractive index of the nucleus is 1.4. The refractive index of a solution is 1.33.

As illustrated in FIG. 32C and FIG. 32D, a sharp reproduced image is obtained for both of the first sample and the second sample.

Figure 33A:
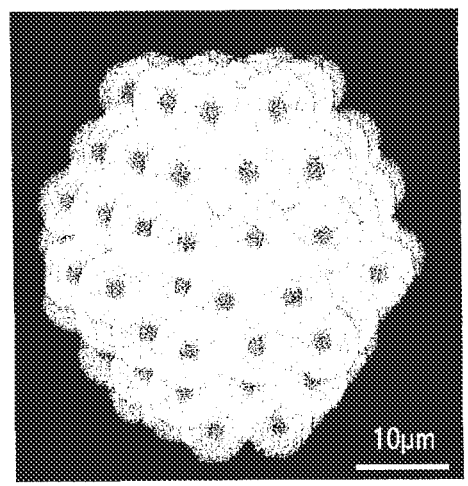
FIG. 33A, FIG. 33B, and FIG. 33C are a diagram illustrating a sample, an image of an initial value, and an image of a reproduced image.
Figure 33B:
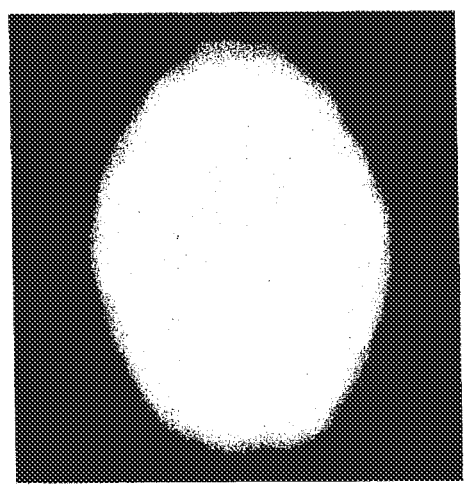
Figure 33C:
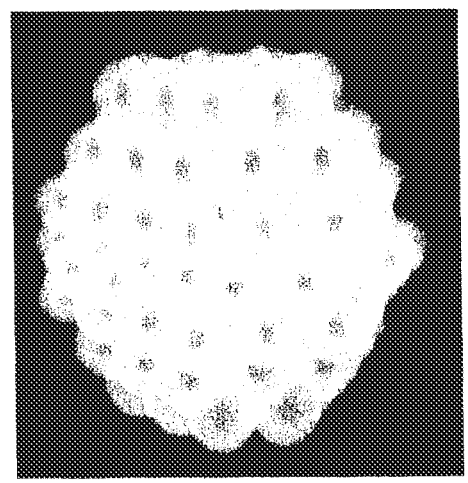

FIG. 33A, FIG. 33B, and FIG. 33C are a diagram illustrating a sample, an image of an initial value, and an image of a reproduced image. FIG. 33A is a diagram illustrating a sample. FIG. 33B is an image of an initial value. FIG. 33C is an image of the reproduced image of the sample.

The sample is 50 μm of aggregate cells. As illustrated in FIG. 33C, a sharp and accurate reproduced image is successfully obtained even for a three-dimensional sample.

In the refractive index distribution estimating system of the present embodiment, it is preferable that the step of calculating an estimation sample image calculate a plurality of the first wavefronts emanating from the plurality of light sources that model the intensity distribution of the pupil of the illumination optical system, calculate a plurality of the second wavefronts after the plurality of first wavefronts pass through the estimation sample, calculate the plurality of first intensity distributions at the imaging position of the imaging optical system using the plurality of second wavefronts, and calculate the image of the estimation sample by summing the plurality of first intensity distributions. It is preferable that the step of optimizing a refractive index distribution of the sample calculate a plurality of second correction wavefronts in which the plurality of second wavefronts are corrected using the captured image and the image of the estimation sample, calculate a gradient of the refractive index distribution of the estimation sample from errors between the plurality of second wavefronts and the plurality of second correction wavefronts, and optimize the refractive index distribution of the estimation sample using the gradient of the refractive index distribution, for each of the light sources.

The calculation of the first wavefront is performed at step S41. The calculation of the second wavefront is performed at step S42. The calculation of the first intensity distribution is performed at step S45 or step S263. The calculation of the image of the estimation sample is performed at step S50 or step S270.

The step of optimizing the refractive index distribution of the sample is step S90 or step S310. The calculation of the second correction wavefront is performed at step S91 or step S311. The calculation of the gradient of the refractive index distribution of the estimation sample is performed at step S92 or step S312.

In the refractive index distribution estimating system of the present embodiment, it is preferable that the step of calculating an estimation sample image include the steps of: calculating the plurality of first wavefronts emanating from the plurality of light sources that model the intensity distribution of the pupil of the illumination optical system; calculating the plurality of second wavefronts after the plurality of first wavefronts pass through the estimation sample; calculating a plurality of third wavefronts at a focus position on the sample side of the imaging optical system from the plurality of second wavefronts; calculating a plurality of fourth wavefronts at the imaging position of the imaging optical system using the plurality of third wavefronts and a pupil function of the imaging optical system, and calculating the plurality of first intensity distributions by squaring each of the plurality of fourth wavefronts; and calculating the estimation sample image by summing the plurality of first intensity distributions.

The step of calculating the first wavefront is step S41. The step of calculating the second wavefront is step S42. The step of calculating the third wavefront is step S43 or step S262.

The step of calculating the first intensity distribution is step S44 and step S45, or step S262 and step S263. The step of calculating the estimation sample image is step S50 or step S270.

In the refractive index distribution estimating system of the present embodiment, it is preferable that the step of optimizing a refractive index distribution of the sample calculate a plurality of second correction wavefronts in which the plurality of second wavefronts are corrected using the captured image and the image of the estimation sample, calculate a gradient of the refractive index distribution of the estimation sample from errors between the plurality of second wavefronts and the plurality of second correction wavefronts, and optimize the refractive index distribution of the estimation sample using the gradient of the refractive index distribution, for each of the plurality of light sources.

In the refractive index distribution estimating system of the present embodiment, it is preferable that the amplitude transmittance be updated using TV regularization.

TV regularization can suppress vibration components while retaining edges. Therefore, it is used in image processing such as noise removal and blurred image correction.

The amplitude transmittance $T_s(r)$ or the amplitude transmittance $T_e(r)$ is updated to the amplitude transmittance $T'_s(r)$ or the amplitude transmittance $T'_z(r)$ by a minimization problem indicated by Expression (51).

$$T_z'(r) = \mathrm{argmin}\{\Sigma_{(r,z)}(\tfrac{1}{2}|T_z'(r) - T_z(r)|_{12}^2 + \Sigma R(T_z'(r)))\} \quad (51)$$

The first term on the right side denotes L2 norm of the estimated residual. The second term on the right side is called a regularization term, and a function characterized by taking smaller value as local changes in the amplitude transmittance $T_s(r)$ or the amplitude transmittance $T_z(r)$ are fewer is usually used. $\tau$ is a constant called regularization parameter.

It is possible to perform smoothing while retaining edges by adding, as this regularization term, a TV regularization term meaning the absolute value sum of the difference of estimated values between adjacent pixels indicated by Expression (52).

$$R(T_z(r)) = \sum_r \sqrt{\left(\frac{\partial T_z(r)}{\partial x}\right)^2 + \left(\frac{\partial T_z(r)}{\partial y}\right)^2 + \left(\frac{\partial T_z(r)}{\partial z}\right)^2} \quad (52)$$

FIG. 34A, FIG. 34B, FIG. 34C, FIG. 34D, FIG. 34E, FIG. 34F, FIG. 34G, and FIG. 34H are diagrams illustrating a sample and images of the reproduced image.

Figure 34A:
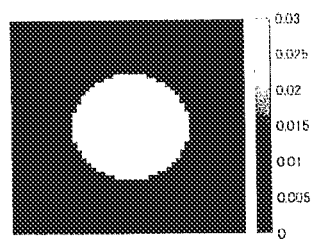
FIG. 34A, FIG. 34B, FIG. 34C, FIG. 34D, FIG. 34E, FIG. 34F, FIG. 34G, and FIG. 34H are diagrams illustrating a sample and images of a reproduced image.
Figure 34B:
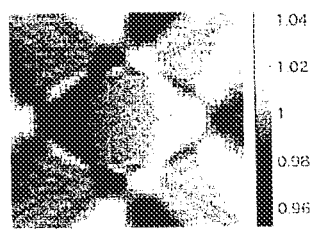
Figure 34C:
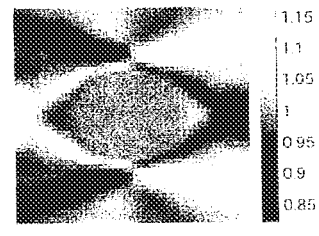

FIG. 34A is a diagram illustrating a sample. FIG. 34B and FIG. 34C are captured images. FIG. 34D, FIG. 34E, FIG. 34F, FIG. 34G, and FIG. 34H are images of the reproduced image of the sample.

The sample is a cylinder. The diameter of the cylinder is 10 μm. The refractive index of the cylinder is 1.36. The cylinder is immersed in a liquid. The refractive index of the liquid is 1.33. That is, the refractive index of the cylinder is higher than the refractive index of the part other than the cylinder by 0.03.

The wavelength of illumination light is 1500 nm. Furthermore, the numerical aperture of the objective lens is 1.4.

FIG. 34B and FIG. 34C are images of the optical image on the XZ plane. In the captured image in FIG. 34B, the numerical aperture of the illumination optical system is 1.0. In the captured image in FIG. 34C, the numerical aperture of the illumination optical system is 0.5-1.0.

The relation between the drawings and the illumination condition, the presence/absence of an initial value, and the presence/absence of TV regularization is provided below.

Figure 34D:
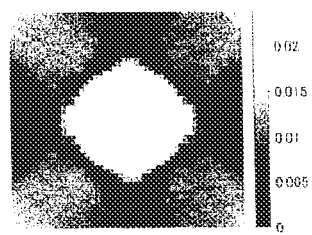
Figure 34E:
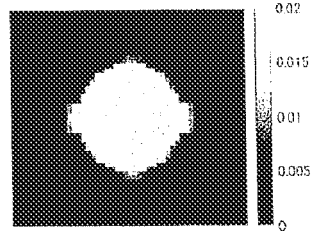
Figure 34F:
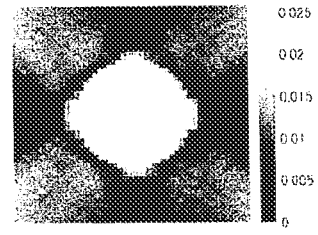
Figure 34G:
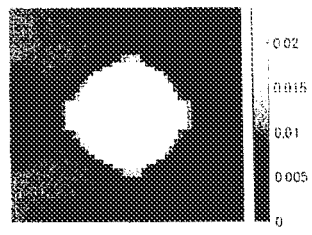
Figure 34H:
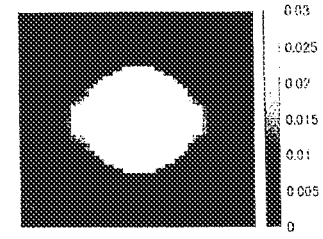

|  | Numerical aperture of illumination optical system | Initial value | TV regularization |
|---|---|---|---|
| FIG. 34D | 1.0 | None | Not applied |
| FIG. 34E | 1.0 | None | Applied |
| FIG. 34F | 1.0 | Calculated from transport of intensity equation | Not applied |
| FIG. 34G | 1.0 | Calculated from transport of intensity equation | Applied |
| FIG. 34H | 0.5-1.0 Annular illumination | Calculated from transport of intensity equation | Applied |

Based on the comparison between FIG. 34D and FIG. 34F, it is understood that it is possible to reproduce an image more accurately by setting an initial value.

Based on the comparison between FIG. 34D and FIG. 34E, it is understood that when TV regularization is performed, it is possible to reconstruct a natural image free from noise since vibration components can be suppressed while edges are retained.

Based on the comparison between FIG. 34G and FIG. 34H, it is understood that it is possible to reproduce an image more accurately with illumination using rings.

The present disclosure includes following disclosures.

(Appendix Mode 1)

A refractive index distribution estimating system according to at least some embodiments of the present disclosure includes:

an illumination optical system configured to illuminate a sample with light rays incident simultaneously from a plurality of directions;

an imaging optical system configured to form an optical image of the sample;

an image sensor configured to acquire a captured image from the optical image of the sample formed by the imaging optical system; and a processor configured to reconstruct a refractive index distribution of the sample from the captured image, wherein the processor performs processing including the steps of:

estimating an estimation sample including a refractive index distribution of the sample;

calculating an image of the estimation sample by calculating a plurality of first intensity distributions at an imaging position of the imaging optical system, using a plurality of first wavefronts emanating from a plurality of light sources that model an intensity distribution of a pupil of the illumination optical system, and summing the first intensity distributions;

optimizing a refractive index distribution of the estimation sample using a plurality of second wavefronts after the first wavefronts pass through the estimation sample, the captured image, and the image of the estimation sample;

updating the estimation sample by repeating calculation of the image of the estimation sample and optimization of the refractive index distribution of the estimation sample; and reconstructing and outputting a structure of the estimation sample using a refractive index distribution of the updated estimation sample.

(Appendix Mode 2)

The refractive index distribution estimating system according to Appendix mode 1, wherein the illumination optical system illuminates the sample with spatial partial coherent light.

According to the present disclosure, it is possible to provide a refractive index distribution estimating system that has a high resolution in a plane orthogonal to the optical axis and is less affected by information other than the sample.

As described above, the present disclosure is suitable for a refractive index distribution estimating system that has a high resolution in a plane orthogonal to the optical axis and is less affected by information other than the sample.

What is claimed is:

1. A refractive index distribution estimating system comprising:

an illumination optical system configured to illuminate a sample with partial coherent illumination;

an imaging optical system configured to form an optical image of the sample;

an image sensor configured to acquire a captured image from the optical image of the sample formed by the imaging optical system; and a processor configured to reconstruct a refractive index distribution of the sample from the captured image, wherein the processor performs processing including the steps of:

estimating an estimation sample including a refractive index distribution of the sample;

calculating an image of the estimation sample by calculating a first intensity distribution at an imaging position of the imaging optical system corresponding to each of a plurality of light sources, using a first wavefront corresponding to each of the plurality of light sources that model an intensity distribution of a pupil of the illumination optical system, and summing the first intensity distribution corresponding to each of the plurality of light sources;

optimizing a refractive index distribution of the estimation sample using a second wavefront after the first wavefront corresponding to each of the light sources passes through the estimation sample, the captured image, and the image of the estimation sample;

updating the estimation sample by repeating calculation of the image of the estimation sample and optimization of the refractive index distribution of the estimation sample; and reconstructing and outputting a structure of the estimation sample using a refractive index distribution of an updated estimation sample wherein in the step of calculating the image of the estimation sample, the processor is configured to:

calculate a plurality of the first wavefronts emanating from the plurality of light sources that model the intensity distribution of the pupil of the illumination optical system;

calculate a plurality of the second wavefronts after the plurality of first wavefronts pass through the estimation sample; and calculate a plurality of the first intensity distributions at the imaging position of the imaging optical system using the plurality of second wavefronts and calculate the image of the estimation sample by summing the plurality of first intensity distributions, and wherein in the step of optimizing the refractive index distribution of the estimation sample, the processor is configured to:

for each of the second wavefronts corresponding to the plurality of light sources as a process target, calculate a second correction wavefront corrected using the captured image and the image of the estimation sample corresponding to the same light source as the second wavefront; and for each of the second wavefronts corresponding to the plurality of light sources as a process target, calculate a gradient of the refractive index distribution of the estimation sample from an error between the second wavefront and the second correction wavefront corresponding to the same light source, and optimize the refractive index distribution of the estimation sample using the gradient of the refractive index distribution.

2. The refractive index distribution estimating system according to claim 1, further comprising:

a driving mechanism configured to change a distance between a focus position of the imaging optical system and a position of the sample in an optical axis direction of the imaging optical system, wherein the processor is configured to:

acquire a plurality of captured images of the sample corresponding to a plurality of distances by changing the distance using the driving mechanism;

calculate a plurality of images of the estimation sample corresponding to the distances are calculated; and optimize the refractive index distribution of the estimation sample in each of the distances.

3. The refractive index distribution estimating system according to claim 1, wherein:

the illumination optical system includes a condenser lens and a first aperture member, the imaging optical system includes an objective lens and a tube lens, and an image of the first aperture member is formed at a pupil position of the objective lens.

4. The refractive index distribution estimating system according to claim 3, wherein the first aperture member has an annular transmission part or darkening part.

5. The refractive index distribution estimating system according to claim 3, further comprising:

a second aperture member different from the first aperture member; and a moving mechanism configured to switch the first aperture member and the second aperture member.

6. A refractive index distribution estimating system comprising:

an illumination optical system configured to illuminate a sample with partial coherent illumination;

an imaging optical system configured to form an optical image of the sample;

an image sensor configured to acquire a captured image from the optical image of the sample formed by the imaging optical system; and a processor configured to reconstruct a refractive index distribution of the sample from the captured image, wherein the processor performs processing including the steps of:

estimating an estimation sample including a refractive index distribution of the sample;

calculating an image of the estimation sample by calculating a first intensity distribution at an imaging position of the imaging optical system corresponding to each of a plurality of light sources, using a first wavefront corresponding to each of the plurality of light sources that model an intensity distribution of a pupil of the illumination optical system, and summing the first intensity distribution corresponding to each of the plurality of light sources;

optimizing a refractive index distribution of the estimation sample using a second wavefront after the first wavefront corresponding to each of the light sources passes through the estimation sample, the captured image, and the image of the estimation sample;

updating the estimation sample by repeating calculation of the image of the estimation sample and optimization of the refractive index distribution of the estimation sample; and reconstructing and outputting a structure of the estimation sample using a refractive index distribution of an updated estimation sample, wherein, in the step of calculating the image of the estimation sample, the processor is configured to:

calculate the first wavefront corresponding to each of the plurality of light sources;

calculate the second wavefront after passing through the estimation sample corresponding to each of the first wavefronts;

calculate a third wavefront at a focus position on the sample side of the imaging optical system corresponding to each of the second wavefronts;

calculate a fourth wavefront at the imaging position of the imaging optical system corresponding to the third wavefront, using the third wavefront and a pupil function of the imaging optical system, and calculate a first intensity distribution corresponding to the fourth wavefront by squaring the fourth wavefront; and calculate the estimation sample image by summing the first intensity distribution corresponding to the fourth wavefront.

7. The refractive index distribution estimating system according to claim 6, wherein in the step of optimizing the refractive index distribution of the estimation sample, the processor is configured to:

for each of the second wavefronts corresponding to the plurality of light sources as a process target, calculate a second correction wavefront is corrected using the captured image and the image of the estimation sample corresponding to the same light source as the second wavefront; and for each of the second wavefronts corresponding to the plurality of light sources as a process target, calculate a gradient of the refractive index distribution of the estimation sample from an error between the second wavefront and the second correction wavefront corresponding to the same light source, and optimize the refractive index distribution of the estimation sample using the gradient of the refractive index distribution.

8. The refractive index distribution estimating system according to claim 7, further comprising:

a driving mechanism configured to change a distance between a focus position of the imaging optical system and a position of the sample in an optical axis direction of the imaging optical system, wherein the processor is configured to:

acquire a plurality of captured images of the sample corresponding to a plurality of distances by changing the distance using the driving mechanism;

calculate a plurality of images of the estimation sample corresponding to the distances are calculated; and optimize the refractive index distribution of the estimation sample in each of the distances.

9. The refractive index distribution estimating system according to claim 7, wherein the illumination optical system includes a condenser lens and a first aperture member, and wherein the imaging optical system includes an objective lens and a tube lens, and wherein an image of the first aperture member is formed at a pupil position of the objective lens.

10. The refractive index distribution estimating system according to claim 9, wherein the first aperture member has an annular transmission part or darkening part.

11. The refractive index distribution estimating system according to claim 9, further comprising:

a second aperture member different from the first aperture member; and a moving mechanism configured to switch the first aperture member and the second aperture member.

\* \* \* \* \*